(12) United States Patent
Lewis et al.

(10) Patent No.: US 7,533,407 B2
(45) Date of Patent: May 12, 2009

(54) SYSTEM AND METHODS FOR PROVIDING NETWORK QUARANTINE

(75) Inventors: Elliot D. Lewis, Bellevue, WA (US); Hakan Berk, Bellevue, WA (US); Narendra C. Gidwani, Kirkland, WA (US); Jesper M. Johansson, Woodinville, WA (US); Timothy M. Moore, Bellevue, WA (US); Ashwin Palekar, Sammamish, WA (US); Calvin C. Choe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 10/823,686

(22) Filed: Apr. 14, 2004

(65) Prior Publication Data
US 2005/0131997 A1   Jun. 16, 2005

Related U.S. Application Data

(60) Provisional application No. 60/529,698, filed on Dec. 16, 2003.

(51) Int. Cl.
G06F 7/04 (2006.01)
G06F 21/00 (2006.01)
(52) U.S. Cl. .................. 726/6; 726/24; 726/25
(58) Field of Classification Search .......... 726/2, 726/24, 25
See application file for complete search history.

(56) References Cited

U.S. PATENT DOCUMENTS

| | | | |
|---|---|---|---|
| 5,557,518 A * | 9/1996 | Rosen | ............ 705/69 |
| 5,659,616 A | 8/1997 | Sudia | |
| 6,023,586 A | 2/2000 | Gaisford et al. | |
| 6,088,451 A * | 7/2000 | He et al. | ............ 726/8 |
| 6,134,680 A | 10/2000 | Yeomans | |

(Continued)

FOREIGN PATENT DOCUMENTS

WO   WO 2004/002062 A1   12/2003

(Continued)

OTHER PUBLICATIONS

Microsoft Corporation. "Microsoft Windows Server 2003 Network Access Quarantine Control," http://download.microsoft.com/download/0/7/e/07ed1953-0ab5-41ea-b5da-41cf8bb9cdae/Quarantine.doc, Mar. 2003.

(Continued)

*Primary Examiner*—Gilberto Barron, Jr.
*Assistant Examiner*—Cordelia Kane
(74) *Attorney, Agent, or Firm*—Merchant & Gould P.C.

(57) ABSTRACT

A client quarantine agent requests bill of health from a quarantine server, and receives a manifest of checks that the client computer must perform. The quarantine agent then sends a status report on the checks back to the quarantine server. If the client computer is in a valid security state, the bill of health is issued to the client. If the client computer is in an invalid state, the client is directed to install the appropriate software/patches to achieve a valid state. When a client requests the use of network resources from a network administrator, the network administrator requests the client's bill of health. If the bill of health is valid, the client is admitted to the network. If the bill of health is invalid, the client is placed in quarantine.

16 Claims, 24 Drawing Sheets

U.S. PATENT DOCUMENTS

| | | | |
|---|---|---|---|
| 6,154,776 | A | 11/2000 | Martin |
| 6,233,577 | B1 | 5/2001 | Ramasubramani |
| 6,233,616 | B1 | 5/2001 | Reid |
| 6,275,941 | B1* | 8/2001 | Saito et al. ............. 726/2 |
| 6,301,613 | B1 | 10/2001 | Ahlstrom et al. |
| 6,321,339 | B1 | 11/2001 | French |
| 6,327,550 | B1 | 12/2001 | Vinberg et al. |
| 6,389,539 | B1 | 5/2002 | Hamilton, II et al. |
| 6,393,484 | B1 | 5/2002 | Massarani |
| 6,553,493 | B1 | 4/2003 | Okumura |
| 6,564,320 | B1 | 5/2003 | De Silva |
| 6,601,175 | B1 | 7/2003 | Arnold et al. |
| 6,611,869 | B1 | 8/2003 | Eschelbeck |
| 6,615,383 | B1 | 9/2003 | Talluri et al. |
| 6,754,664 | B1 | 6/2004 | Bush |
| 6,847,609 | B1 | 1/2005 | Sarnikowski |
| 6,854,056 | B1 | 2/2005 | Banantar |
| 6,871,284 | B2 | 3/2005 | Cooper et al. |
| 6,873,988 | B2 | 3/2005 | Herrmann et al. |
| 6,892,317 | B1 | 5/2005 | Sampath et al. |
| 6,993,686 | B1 | 1/2006 | Groenendaal et al. |
| 7,020,532 | B2 | 3/2006 | Johnson |
| 7,032,022 | B1 | 4/2006 | Shanumgam |
| 7,039,807 | B2 | 5/2006 | Spitz |
| 7,046,647 | B2 | 5/2006 | Oba et al. |
| 2001/0047514 | A1 | 11/2001 | Goto et al. |
| 2002/0010800 | A1 | 1/2002 | Riley et al. |
| 2002/0073308 | A1 | 6/2002 | Benantar |
| 2002/0078347 | A1 | 6/2002 | Hericourt et al. |
| 2002/0129264 | A1 | 9/2002 | Rowland et al. |
| 2002/0144108 | A1 | 10/2002 | Benantar |
| 2002/0199116 | A1 | 12/2002 | Hoene et al. |
| 2003/0009752 | A1 | 1/2003 | Gupta |
| 2003/0014644 | A1 | 1/2003 | Burns et al. |
| 2003/0041167 | A1 | 2/2003 | French et al. |
| 2003/0044020 | A1 | 3/2003 | Aboba et al. |
| 2003/0055962 | A1 | 3/2003 | Freund et al. |
| 2003/0055994 | A1 | 3/2003 | Herrmann et al. |
| 2003/0065919 | A1 | 4/2003 | Albert |
| 2003/0087629 | A1 | 5/2003 | Juitt et al. |
| 2003/0097315 | A1 | 5/2003 | Guerrero et al. |
| 2003/0126136 | A1 | 7/2003 | Omoigui |
| 2003/0191966 | A1 | 10/2003 | Gleichauf |
| 2003/0200464 | A1 | 10/2003 | Kidron |
| 2003/0221002 | A1 | 11/2003 | Srivastava et al. |
| 2004/0006532 | A1 | 1/2004 | Lawrence et al. |
| 2004/0039580 | A1 | 2/2004 | Steger |
| 2004/0083129 | A1 | 4/2004 | Herz |
| 2004/0085944 | A1 | 5/2004 | Boehm |
| 2004/0107360 | A1* | 6/2004 | Herrmann et al. ........... 713/201 |
| 2004/0153171 | A1 | 8/2004 | Brandt et al. |
| 2004/0153823 | A1 | 8/2004 | Ansari |
| 2004/0167984 | A1 | 8/2004 | Herrmann |
| 2004/0249974 | A1 | 12/2004 | Alkhatib et al. |
| 2004/0250107 | A1 | 12/2004 | Guo |
| 2004/0268148 | A1 | 12/2004 | Karjala |
| 2005/0015622 | A1 | 1/2005 | Williams et al. |
| 2005/0021733 | A1 | 1/2005 | Clinton |
| 2005/0021975 | A1 | 1/2005 | Liu |
| 2005/0081111 | A1 | 4/2005 | Morgan et al. |
| 2005/0086337 | A1 | 4/2005 | Quittek et al. |
| 2005/0086502 | A1 | 4/2005 | Rayes et al. |
| 2005/0114502 | A1 | 5/2005 | Raden et al. |
| 2005/0131997 | A1 | 6/2005 | Lewis et al. |
| 2005/0138204 | A1 | 6/2005 | Iyer et al. |
| 2005/0144532 | A1 | 6/2005 | Dombrowa et al. |
| 2005/0165953 | A1 | 7/2005 | Oba et al. |
| 2005/0166197 | A1 | 7/2005 | Riley |
| 2005/0172019 | A1 | 8/2005 | Williamson et al. |
| 2005/0188285 | A1 | 8/2005 | Fellenstein et al. |
| 2005/0193386 | A1 | 9/2005 | McCaleb et al. |
| 2005/0198527 | A1 | 9/2005 | Johnson et al. |
| 2005/0254651 | A1 | 11/2005 | Porozni |
| 2005/0256970 | A1 | 11/2005 | Harrison |
| 2006/0002556 | A1 | 1/2006 | Paul |
| 2006/0004772 | A1 | 1/2006 | Hagan |
| 2006/0033606 | A1 | 2/2006 | Howarth et al. |
| 2006/0036733 | A1 | 2/2006 | Fujimoto et al. |
| 2006/0085850 | A1 | 4/2006 | Mayfield et al. |
| 2006/0143440 | A1 | 6/2006 | Ponnapalli |
| 2006/0164199 | A1 | 7/2006 | Gilde et al. |
| 2007/0100850 | A1 | 5/2007 | Choe et al. |
| 2007/0127500 | A1 | 6/2007 | Maeng |
| 2007/0143392 | A1 | 6/2007 | Choe et al. |
| 2007/0150934 | A1 | 6/2007 | Fiszman et al. |
| 2007/0198525 | A1 | 8/2007 | Chatterjee et al. |

FOREIGN PATENT DOCUMENTS

| | | |
|---|---|---|
| WO | WO 2004/042540 A2 | 5/2004 |
| WO | WO 2004/046953 A1 | 6/2004 |
| WO | WO2005040995 | 5/2005 |

OTHER PUBLICATIONS

Thompson, J. David and Kate Arndt. "A Secure Public Network Access Mechanism," *UNIX Security Symposium III Proceedings*, Sep. 14-16, 1992.

Thurm, Scott. "Cisco Acts to Take Greater Role In Virus Protection of Networks," *The Wall Street Journal*, Nov. 19, 2003.

Network Access Protection Platform Overview, *The Cable Guy—Jul. 2005* [online], Jun. 29, 2005, [Retrieved Jul. 22, 2006], Retrieved from: http://www.microsoft.com/technet/community/columns/cableguy/cg0705.mspx.

Pearce, C., Bertok, P., Thevathayan, C., *A Protocol for Secrecy and Authentication within Proxy-Based SPKI/SDSI Mobile Networks* [online], AusCERT 2004 IT Security Conference, 2004, [Retrieved Jul. 24, 2006], Retrieved from: http://www.cs.rmit.edu.au/eCDS/publications/auscert2004.pdf.

Persiano, P., Visconti, I., *A Secure and Private System for Subscription-Based Remote Services* [online], ACM Transactions on Information and System Security, vol. 6, NO> $< Nov. 2003, http://portal.acm.org/citation.cfm?doid=950191.950193.

"Lockdown Networks Unveils Switch-Level Network Access Control," *IT Observer*, http://www.ebcvg.com/press.php?id=1643, 4 pages (Sep. 13, 2005).

"TPM Work Group," *Trusted Computing Group*, https://www.trustedcomputinggroup.org/groups/tpm/, 1 page (Retrieved Oct. 10, 2006).

Cisco Systems, "Cisco Clean Access Manager Installation and Administration Guide," Release 3.5, pp. 1-62 (Jan. 2006).

Cisco Systems, "Cisco Clean Access: A Network Admissions Control Appliance," http://www.cisco.com/en/US/products/ps6128/products_data_sheet0900aecd802da1b5.html, 6 pages (Retrieved Sep. 26, 2005).

Cisco Systems, "Securing Complexity with NAC Appliance (Cisco Clean Access): A Technical View," *NAC Appliance Technical Marketing Team*, pp. 1-41 (Jun. 2006).

Conry-Murray, A., "Cisco NAC vs. Microsoft NAP," http://www.itarchitectmag.com/shared/article/show/Article.jhtml;jsessionid=NFZ3V0ACPV5KQSNDLPCKHSCJUN, 4 pages (Mar. 1, 2005).

Droms, R. et al., "Dynamic Host Configuration Protocol for IPv6 (DHCPv6)," RFC 3315, 100 pages (Jul. 2003).

EP Communication dated May 9, 2006 from EP Application No. 05 103 440.3-2413, 6 pages.

European Search Report mailed Aug. 18, 2005 from EP Application No. 05103440.3-2416 PCT/, 4 pages.

F5 Networks, "Best-In-Class Enterprise SSL VPN," 6 pages (Copyright 2005).

Jaganathan, K., et al.., "SPNEGO-based Kerberos and NTLM HTTP Authentication in Microsoft Windows," RFC 4559; http://www.ietf.org/rfc/rfc4559.txt, 8 pages (Jun. 2006).

Microsoft Releases Windows Server 2003 Service Pack 1, http://www.microsoft.com/presspass/press/2005/mar05/03-30winservsp1pr.mspx, 4 pages (Retrieved Sep. 26, 2005).

Network Access Protection, Microsoft Corporation, 7 pages (Jun. 25, 2007).

Office Action mailed Dec. 12, 2007 in U.S. Appl. No. 10/973,970.

Office Action mailed Dec. 12, 2007 in U.S. Appl. No. 11/056,276.

U.S. Appl. No. 11/926,794, filed Oct. 29, 2007.

Sygate Secure Enterprise, Sygate Technologies, Inc., 4 pages (Copyright 2004).

TCG Trusted Network Connect TNC Architecture for Interoperability Specification Version 1.0, Revision 4, 39 pages (May 3, 2005).

White, D. et al., "NAC Solution and Technology Overview," *Cisco Network Admission Control*, vol. II: NAC Deployment and Troubleshooting, 6 pages (Jan. 19, 2007).

"The Cable Guy—Jul. 2005: Network Access Protection Platform Overview," Published: Jun. 29, 2005; Updated: May 23, 2006; [8 pages].

Pearce, Craig; Bertok, Peter; Thevathyan, Charles. "A Protocol for Secrecy and Authentication within Proxy-Based SPKI/SDSI Mobile," School fo Computer Science and Information Technology, RMIT University, 2004, pp. 1-14.

Persiano, Pino; Visconti, Ivan. "A secure and private system for subscription-based remote services," Universita di Salerno, Nov. 2003, [29 pages].

Cisco NAC—http://www.cisco.com/en/US/netsol/ns466/networking_solutions_package.html, Sep. 2006.

Discussion of Cisco NAC vs. Microsoft NAP—http://www.itarchitect.com/shared/article/showArticle.jhtml?articleId=60401143&classroom=, Mar. 1, 2005.

Mockapetris, P., "Domain names—Implementation and Specification", RFC1035, Nov. 1987, http://www.ietf.org/rfc/rfc1035.txt.

Bradner, S., "Key words for use in RFCs to Indicate Requirement Levels", RFC 2119, Mar. 1997, http://www.ietf.org/rfc/rfc2119.txt.

Hoffman, P., "UTF-16, an encoding of ISO 10646", RFC 2781, Feb. 2000, http://www.ietf.org/rfc/rfc2781.txt.

Web Service Health Modeling, Instrumentation, and Monitoring: Developing and Using a Web Services Health Model for the Electronics Scenario http://msdn.microsoft.com/library/default.asp?url=library/en-us/dnbda/html/MSArcSeriesMCS6.asp, Sep. 2005.

Fidelia Releases Windows Version of its NetVigil™ Real-time Performance Management and Monitoring Suite http://www.fidelia.com/news/news-win-version.php, Aug. 19, 2002.

*AAA: from Radius to Diameter* [online], Sep. 18, 2003, [Retrieved Jul.19, 2006], Retrieved from: http://www. dsv.su.se/~icss-pec/study/AAA.pdf.

Bechler, M., Hof, H., Kraft, D., Pahlke, F., Wolf, L., *A Cluster-Based Security Architecture for Ad Hoc Networks* [online], IEEE Infocom 2004, Mar. 7-11th, 2004, [Retrieved Jul. 19, 2006], Retrieved from: Http://www.ieee-infocom.org/2004/Papers/50_1.PDF.

Cisco Systems, *Cisco Clean Access:In-Band and Out-Of-Band Deployment Options and Considerations* [online], © 1992-2006, 2003, [Retrieved Jul. 20, 2007], Retrieved from: http://www.cisco.com/applications/pdf/en/us/guest/products/ps6128/c1244/cdccont_0900aecd802bdc42.pdf.

Jansen, W., Karygiannis, T., Korolev, V., Gavrila, S., Iorga, M., *Policy Expression and Enforcement for Handheld Devices* [online], Apr. 2003, [Retrieved Jul. 18, 2006], Retrieved from: http://csrc.nist.gov/publications/nistir-6981.pdf.

Johnston, W., Mudumbai, S., Thompson, M., *Authorization and Attribute Certificates for Widely Distributed Access Control* [online], IEEE 7th International Workshops on Enabling Technologies: Infrastructure for Collaborative Enterprises—WETICE '98, Jun. 17-19th, 1998, [Retrieved Jul. 18, 2006], Retrieved from: http://dsd.lbl.gov/~mrt/papers/cert.based.access.control.ieee.pdf.

Lui, X., Madson, C., McGraw, D., Nourse, A., *Cisco Systems Simple Certificate Enrollment Protocol (SCEP)* [online], Jan. 2000, [Retrieved Dec. 9, 2007], Retrieved from: http://ietfreport.isoc.org/all-ids/draft-nourse-scep-01.txt.

Murphy, T., *The cdma2000 packet core network* [online], 2001, [Retrieved Jul. 19, 2007], Retrieved from: http://www.ericsson.com/ericsson/corpinfo/publications/review/2001_02/files/2001025.pdf.

*New Trusted Computing Group Formed to Advance the Adoption of Open Standards for Trusted Computed Technologies*, Apr. 8, 2003, [Retrieved Mar. 3, 2007], Retrieved from: https://www.trustedcomputinggroup.org/news/press/tcg/2003/2003_04_08_tcg_formed.pdf.

Network Access Protection Platform Overview, *The Cable Guy—Jul. 2005* [online], Jun. 29, 2005, [Retrieved Jul. 22, 2006], Retrieved from: http://www.microsoft.com/technet/community/columns/cableguy/cg0705.mspx.

Pearce, C., Bertok, P., Thevathayan, C., *A Protocol for Secrecy and Authentication within Proxy-Based SPKI/SDSI Mobile Networks* [online], AusCERT 2004 IT Security Conference, 2004, http://www.cs.rmit.edu.au/eCDS/publications/auscert2004.pdf.

Persiano, P., Visconti, I., *A Secure and Private System for Subscription-Based Remote Services* [online], ACM Transactions on Information and System Security, vol. 6, NO>$ <Nov. 2003, http://portal.acm.org/citation.cfm?doid=950191.950193.

Rigney, C., Willens, S., Rubens, A., Simpson, W., *Remote Authentication Dial In User Service (Radius)* [online], RFC 2865, Jun. 2000, [Retrieved Dec. 9, 2007], Retrieved from: http://www.faqs.org/ftp/rfc/pdf/rfc2865.txt.pdf.

Rigney, C., Rubens, A., Simpson, W., Willens, S., *Remote Authentication Dial In User Service (Radius)* [online], RFC 2058, Jan. 1997, [Retrieved Mar. 3, 2007], Retrieved from: http://www.freeradius.org/rfc/rfc2058.txt.

Rutishauser, U., Shafer, A., *Open reference implementation of a SCEP v2 client* [online], Mar. 1, 2002, [Retrieved Jul,. 20, 2007], Retrieved from: http://www.urut.ch/scep/scepclient.pdf.

Scheifler, R., *X Window System Protocol, Version 11, Alpha Update Apr. 1987* [online], RFC 1013, Jun. 1987, [Retrieved Mar. 7, 2007], Retrieved from: http://www.faqs.org/ftp/rfc/pdf/rfc1013.txt.pdf..

TCG, *TCG Trusted Network Connect TNC IF-TNCCS Specification Version 1.0* [online], May 1, 2006, [Retrieved Mar. 3, 2007], Retrieved from: https://www.trustedcomputinggroup.org/specs/TNC/TNC_IF-TNCCS_v1_0_r2.pdf.

TCG, *TCG Trusted Network Connect TNC Architecture for Interoperability Specification Version 1.1*[online], May 1, 2006, [Retrieved Mar. 3, 2007], Retrieved from: https://www.trustedcomputinggroup.org/specs/TNC/TNC_Architecture_v1_1_r2.pdf.

TCG, *TCG Trusted Network Connect TNC Architecture for Interoperability Specification Version 1.2*[online], May 21, 2006, [Retrieved Jul. 5, 2007], Retrieved from: https://www.trustedcomputinggroup.org/specs/TNC/TNC_Architecture_v1_2_r4.pdf.

Thompson, M., Essiari, A., Mudumbai, S., *Certificate-Based Autorization Policy in a PKI Environment* [online], Nov. 2003 [Retrieved Jul. 18, 2006], pp. 566-588, vol. 6, No. 4, Retrieved from: http://delivery.acm.org/10.1145/960000/950196/p566-r_thompson.pdf?key1=950196&key2=9465223511&coll=Portal&dl=GUIDE&CFID-1348718&CFTOKEN=37872952.

*X11* [online], [Retrieved Mar. 4, 2007], Retrieved from: http://en.wikipedia.org/wiki/X_Window_System.

Zorn, G., *Microsoft Vendor-specific Radius Attributes* [online], RFC 2548, Mar. 1999, [Retrieved Jul. 19, 2006], Retrieved from: ftp://ftp.rfc-editor.org/in-notes/rfc2548.txt.

* cited by examiner

500

| 501 Creation Time |
|---|
| 502 Expiry Time |
| 503 Manifest Version |
| 504 Integrity Check |
| 505 GUID |

2010 SMS ID

2020 Quarantine Check ID

2030 Time

2040 Signature

FIGURE 20

SYSTEM AND METHODS FOR PROVIDING NETWORK QUARANTINE

This patent application claims the benefit of U.S. Provisional Patent Application No. 60/529,698 file Dec. 16, 2003.

FIELD OF THE INVENTION

The present invention relates generally to network access management, and relates more particularly to checking the security state of clients before allowing them access to network resources.

BACKGROUND OF THE INVENTION

In computer networks, clients, servers, and peers commonly use trust models and mechanisms to ensure that unauthorized users do not gain access to network resources such as files, printers, other computers, or anything accessible on the network. These trust models and mechanisms are used to identify those users that are not malicious. However, it is possible that a user's machine poses and danger to the network without the user's knowledge. For example, a machine could contain a virus, or possess a security hole of which the user is unaware. Thus no matter how non-malicious the user is, the insecure state of the user's machine should be isolated from network until the security deficiencies are repaired. This security problem has particular application to three networking environments: Dynamic Host Configuration Protocol (DHCP), Virtual Private Networks (VPN), IEEE 802.1X, and Internet Protocol Security (IPsec).

DHCP is an Internet Protocol (IP) allocation specification whereby a server can allocate, or "lease," an IP address to a client for a specific amount of time. When a DHCP client attaches itself to the network for the first time, it broadcasts a DHCP DISCOVER packet. A DHCP server on the local segment intercepts the broadcast and returns a DHCP OFFER packet that contains an IP address and other information necessary for provisioning the client with network access. The client may receive multiple DHCP OFFER packets from several different servers, so it must choose between them, and broadcast a DHCP REQUEST packet that identifies the explicit server chosen. The chosen server would return a DHCPACK that tells the client the lease is finalized. If the offer is no longer valid for some reason-perhaps due to a time-out or another client allocating the lease-then the selected server must respond with a DHCPNAK message. This would cause the client to send another DHCPDISCOVER packet, starting the process over again.

If a client has obtained a network address through some other means (e.g., manual configuration), it may use a DHCPINFORM request message to obtain other local configuration parameters. Servers receiving a DHCPINFORM message construct a DHCPACK message with any local configuration parameters appropriate for the client. Once the client has the lease, it must be renewed prior to the lease expiration through another DHCP REQUEST message. If a client finishes using a lease prior to its expiration date, the client is sends a DHCP RELEASE message to the server so that the lease can be made available to other nodes. If the server does not hear from the client by the end of the lease, it marks the lease as non-renewed, and makes it available for other clients to use.

In conventional DHCP provisioning systems, the DHCP server may conduct an authentication procedure to ensure that clients requesting network access have verified credentials. For example, before providing the client with the DHCP OFFER, the DHCP server on an organization's local area network (LAN) requires an access code to demonstrate that a user has authorization to access the LAN. The authentication procedure prevents unauthorized or malicious users from gaining access to network resources. However, the conventional authentication procedure does not prevent non-secure, or even malicious, machines from accessing the network. A user may have valid authorization to access the network, but the user's machine can be infected with a virus, or contain a security hole, that should be corrected before the machine is allowed access the network.

Another environment where a machine with a bad security state poses a risk to the network is VPN. VPN is the extension of a private network that encompasses links across shared or public networks like the Internet. A VPN enables you to send data between two computers across a shared or public internetwork in a manner that emulates the properties of a point-to-point private link. The act of configuring and creating a virtual private network is known as virtual private networking. To emulate a point-to-point link, data is encapsulated, or wrapped, with a header that provides routing information allowing it to traverse the shared or public transit internetwork to reach its endpoint. To emulate a private link, the data being sent is encrypted for confidentiality. Packets that are intercepted on the shared or public network are indecipherable without the encryption keys. The portion of the connection in which the private data is encapsulated is known as the tunnel. The portion of the connection in which the private data is encrypted is known as the virtual private network (VPN) connection.

VPN also uses an authentication protocol. A network access server (NAS) sends to VPN client a challenge, which consists of a session ID and an arbitrary challenge string, to the remote client. The remote client must return the user name and an encrypted form of the challenge string, the session ID, and the MD4-hashed password. This design, which uses a hash of the MD4 hash of the password, provides an additional level of security because it allows the server to store hashed passwords instead of clear-text passwords. However, once again the conventional authentication procedure does not prevent non-secure, or even malicious, machines from accessing the network. A VPN client may present valid authentication, but the VPN client machine itself can be infected with a virus, or contain a security hole, that should be corrected before the machine is allowed access the VPN.

Yet another environment where user authentication is insufficient is the use of IPsec. IPsec defines two functions that ensure confidentiality: data encryption and data integrity. IPsec uses an authentication header (AH) to provide source authentication and integrity without encryption, and the Encapsulating Security Payload (ESP) to provide authentication and integrity along with encryption. With IPsec, only the sender and recipient know the security key. If the authentication data is valid, the recipient knows that the communication came from the sender and that it was not changed in transit.

IPsec can be envisioned as a layer below the TCP/IP stack. This layer is controlled by a security policy on each computer and a negotiated security association between the sender and receiver. The policy consists of a set of filters and associated security behaviors. If a packet's IP address, protocol, and port number match a filter, the packet is subject to the associated security behavior. The first such packet triggers a negotiation of a security association between the sender and receiver. Internet Key Exchange (IKE) is the standard protocol for this negotiation. During an IKE negotiation, the two computers agree on authentication and data-security methods, perform mutual authentication, and then generate a shared key for subsequent data encryption.

After the security association has been established, data transmission can proceed for each computer, applying data security treatment to the packets that it transmits to the remote receiver. The treatment can simply ensure the integrity of the transmitted data, or it can encrypt it as well. Data integrity and data authentication for IP payloads can be provided by an authentication header located between the IP header and the transport header. The authentication header includes authentication data and a sequence number, which together are used to verify the sender, ensure that the message has not been modified in transit, and prevent a replay attack.

However, once again the conventional authentication procedure does not prevent non-secure, or even malicious, machines from accessing the network. A computer may present valid authentication, but the machine itself can be infected with a virus, or contain a security hole, that should be corrected before the machine is allowed access the network resources of another computer.

IEEE 802.1x is a standard for port-based network access control that provides authenticated network access to 802.11 wireless networks and wired Ethernet networks. Port-based network access control uses the physical characteristics of a switched local area network (LAN) infrastructure to authenticate devices that are attached to a LAN port and to prevent access to that port in cases where the authentication process fails.

During a port-based network access control interaction, a LAN port adopts one of two roles: authenticator or supplicant. In the role of authenticator, a LAN port enforces authentication before it allows user access to the services that can be accessed through that port. In the role of supplicant, a LAN port requests access to the services that can be accessed through the authenticator's port. An authentication server, which can either be a separate entity or co-located with the authenticator, checks the supplicant's credentials on behalf of the authenticator. The authentication server then responds to the authenticator, indicating whether the supplicant is authorized to access the authenticator's services.

The authenticator's port-based network access control defines two logical access points to the LAN, through one physical LAN port. The first logical access point, the uncontrolled port, allows data exchange between the authenticator and other computers on the LAN, regardless of the computer's authorization state. The second logical access point, the controlled port, allows data exchange between an authenticated LAN user and the authenticator. IEEE 802.1x uses standard security protocols, such as Remote Authentication Dial-In User Service (RADIUS), to provide centralized user identification, authentication, dynamic key management, and accounting.

However, once again the conventional authentication procedure does not prevent non-secure, or even malicious, machines from accessing the network. A computer may present valid authentication, but the machine itself can be infected with a virus, or contain a security hole, that should be corrected before the machine is allowed access the network resources of another computer. Accordingly, the is a need in the art for a system and method to ensure that clients are not provisioned with network access until they are secure, and can prove their security state.

BRIEF SUMMARY OF THE INVENTION

In view of the foregoing, the present invention provides a system for ensuring that machines having invalid or corrupt states are restricted from accessing network resources. The invention provides a quarantine server located on a trusted machine in a network, and a quarantine agent located on a client computer that wishes to gain access to network resources administered by an organization. The quarantine agent requests a bill of health (BoH) from the quarantine server. The quarantine server responds with a manifest of checks that the client computer must perform. The quarantine agent then sends a status report on the checks back to the quarantine server. If the client computer is in a valid state, the BoH is issued to the client. A valid state may be that all necessary patches are installed, or that necessary security software is installed. If the client computer is in an invalid state, the client is directed to install the appropriate software/patches to achieve a valid state.

When a client requests the use of network resources from a network administrator, the network administrator requests the client's BoH. If the BoH is valid, the client is admitted to the network. If the BoH is invalid, or if the client does not have a quarantine agent, the client is placed in quarantine, in which the only network resources accessible to the client are those necessary to install the quarantine agent and requisite software/patches to achieve a valid state.

Additional features and advantages of the invention are made apparent from the following detailed description of illustrative embodiments which proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 5 illustrates a bill of health data structure of the present invention;

FIG. 20 illustrates a proof of health of the present invention;

Figure 1A:
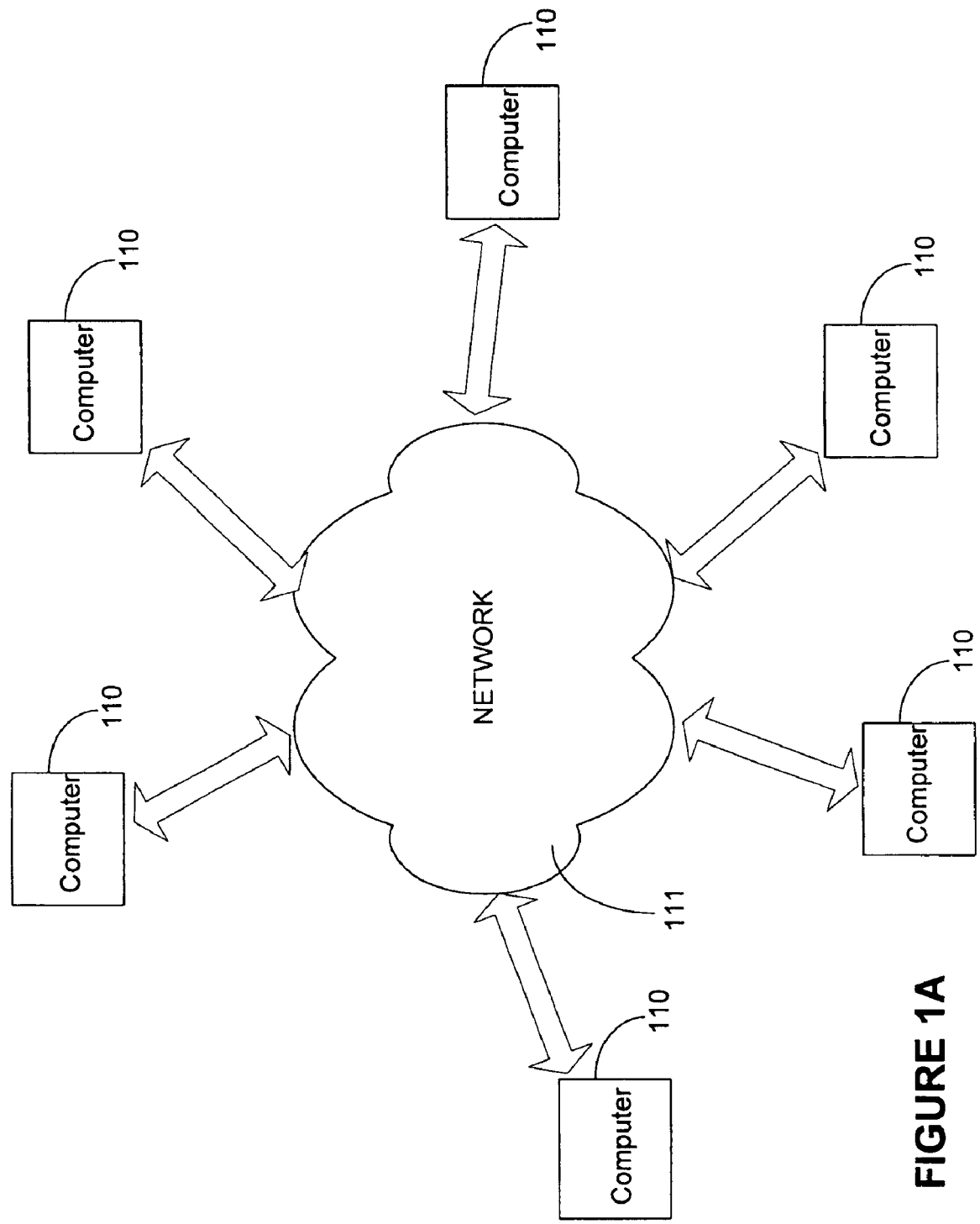
FIG. 1A is a schematic generally illustrating an exemplary network environment across which the present invention operates.

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE INVENTION

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

An example of a networked environment in which the invention may be used will now be described with reference to FIG. 1A. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, network servers, quarantine servers, or peers with respect to other computers. Accordingly, the various embodiments of the invention may be practiced on clients, network servers, quarantine servers, peers, or combinations thereof, even though specific examples contained herein do not refer to all of these types of computers.

Figure 1B:
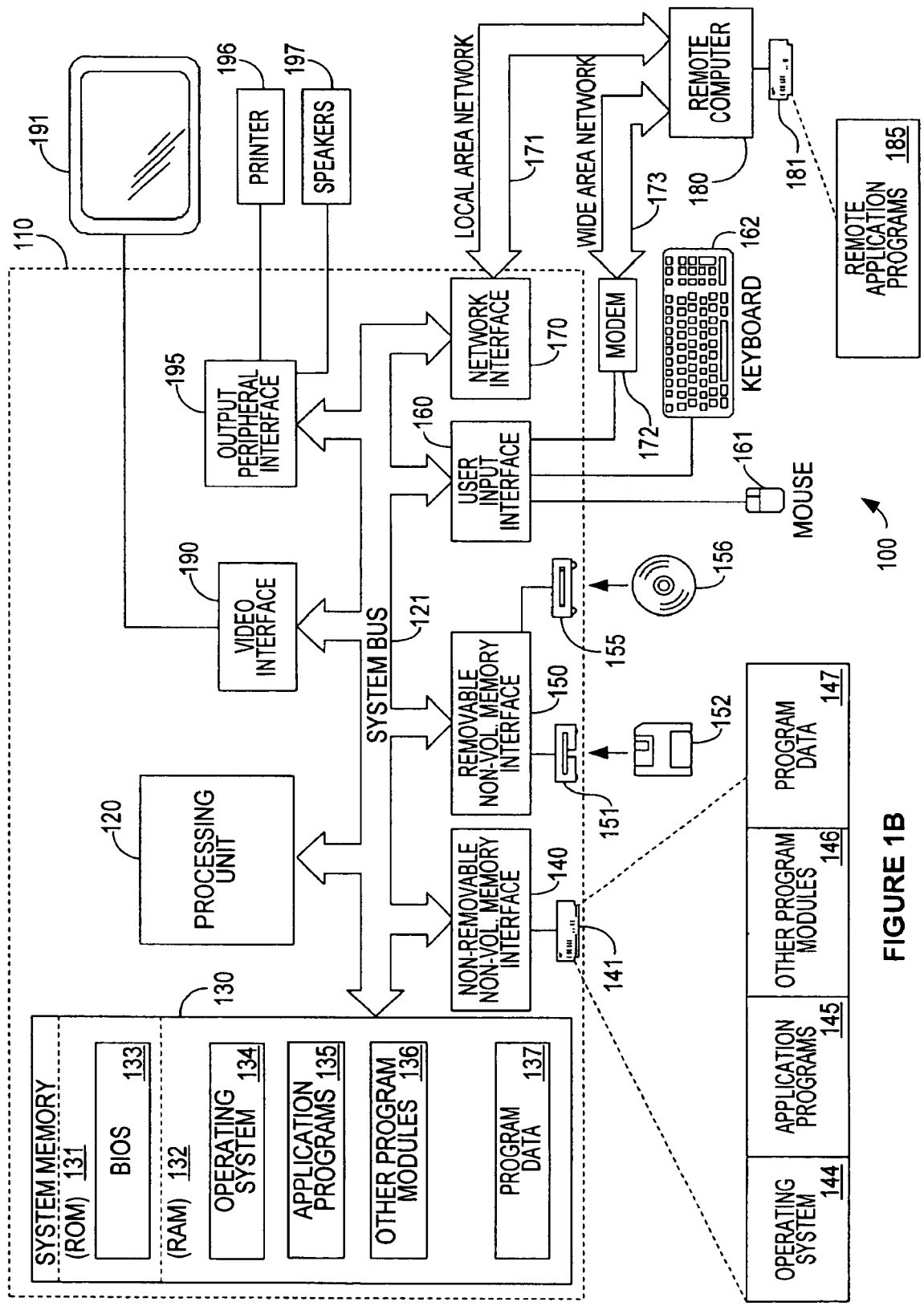
FIG. 1B is a block diagram generally illustrating an exemplary computer system on which the present invention resides.

FIG. 1B illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general-purpose or special-purpose computing system environments or configurations. Examples of well known computing systems, environments, and configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer-storage media including memory-storage devices.

With reference to FIG. 1B, an exemplary system for implementing the invention includes a general-purpose computing device in the form of a computer 110, which may act as a client, network server, quarantine server, or peer within the context of the invention. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communication media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1B illustrates an operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1B provide storage of computer-readable instructions, data structures, program modules, and other data for the computer 110. In FIG. 1B, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 may operate in a networked environment using logical connections to one or more remote computers, such as a remote computer 180. The remote computer 180 may be another personal computer, a server, a router, a network PC, a peer device, or other common network node and typically includes many or all of the elements described above relative to the personal computer 110 although only a memory storage device 181 has been illustrated in FIG. 1B. The logical connections depicted in FIG. 1B include a local area network (LAN) 171 and a wide area network (WAN) 173 but may also include other networks. Such networking environments are commonplace in offices, enterprise-wide computer networks, intranets, and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1B illustrates the remote application programs 185 as residing on the memory device 181. It will be appreciated that the network connections shown are exemplary, and other means of establishing a communications link between the computers may be used.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
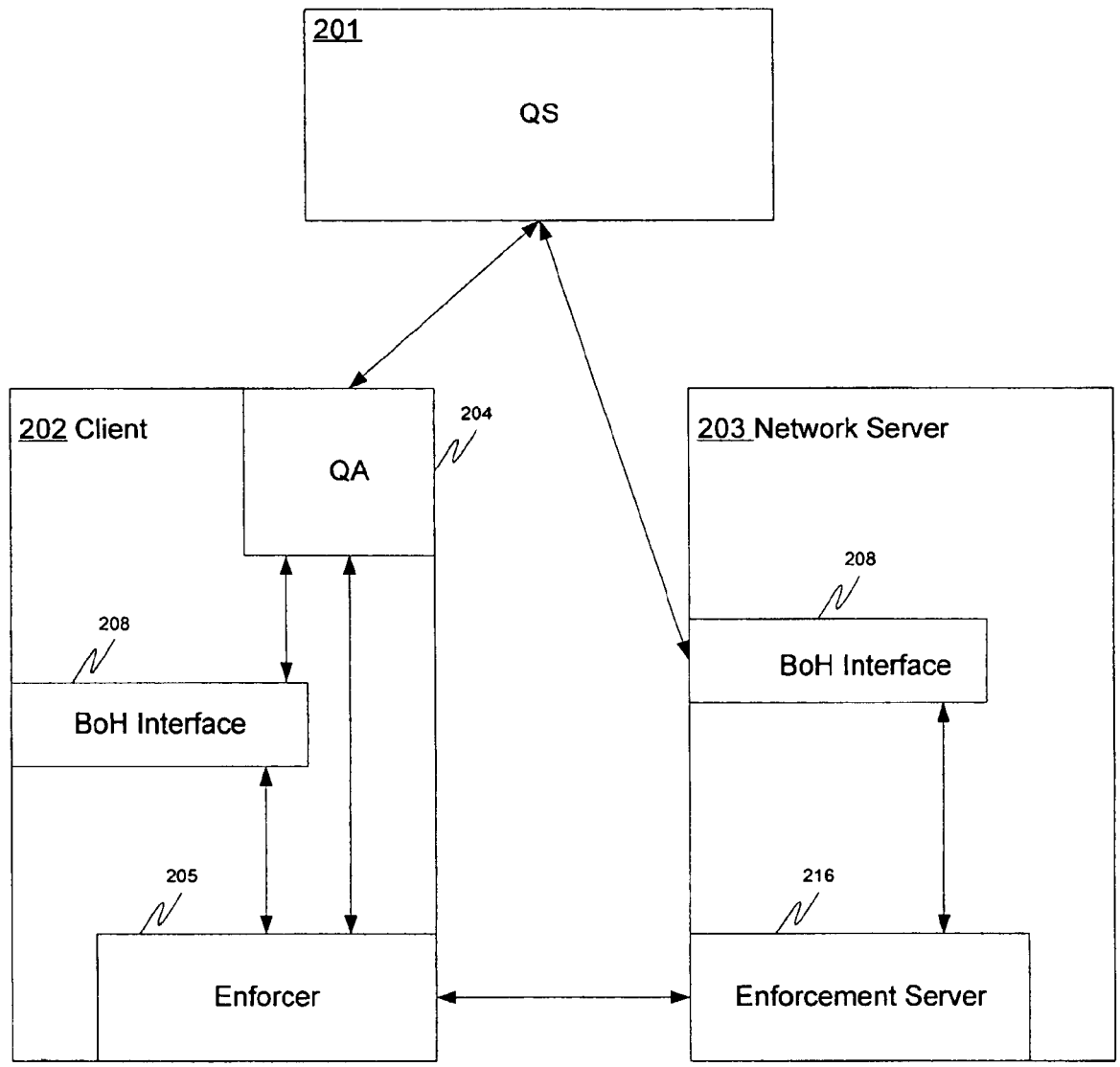
FIG. 2 is a schematic overview of the components of the present invention.

With reference to FIG. 2, the invention comprises at least a quarantine server (QS) 201, a client 202, and a network server 203. The client 202 includes a quarantine agent (QA) 204 for communicating with the QS 201, and an enforcer 205 for communicating with the network server 203. The network server 203 includes an enforcement server 216, which denies client 202 access to network resources until client 202 obtains a valid bill of health (BoH) and presents proof of that BoH signifying that client 202 is in a valid security state. Until client 202 obtains a valid BoH, the client 202 is in a quarantine state and has access only to designated network resources for fixing the client's security state. One such accessible resource is the QS 201, which issues the BoH.

To obtain the BoH, the QA 204 sends a BoH request to the QS 201, which returns a manifest indicating checks that must be performed on client 202. The QA 204 receives the manifest and returns a status report back to the QS 201 indicating the result of the checks. If the client 202 passed all of the checks in the manifest, then the QS 201 issues a validated BoH to the QA 204 of the client 202. The client 202 further comprises a BoH interface 208 for providing and validating proof of the BoH. The enforcer 205 obtains proof of the BoH from the BoH interface 208 and then presents that proof of BoH to network server 203. Network server 203 also includes a BoH interface 208. Network server 203 employs the BoH interface 208 to validate the BoH by comparing the BoH either to a stored BoH, or a BoH obtained from QS 201. Upon recognizing from the proof of BoH that client 202 is in a valid security state, network server 203 allows client 202 access to network resources. However, if the client 202 failed the checks in manifest, client 202 is directed to make changes necessary for a valid security state. The system and methods of the present invention are now described below in greater detail.

Figure 3:
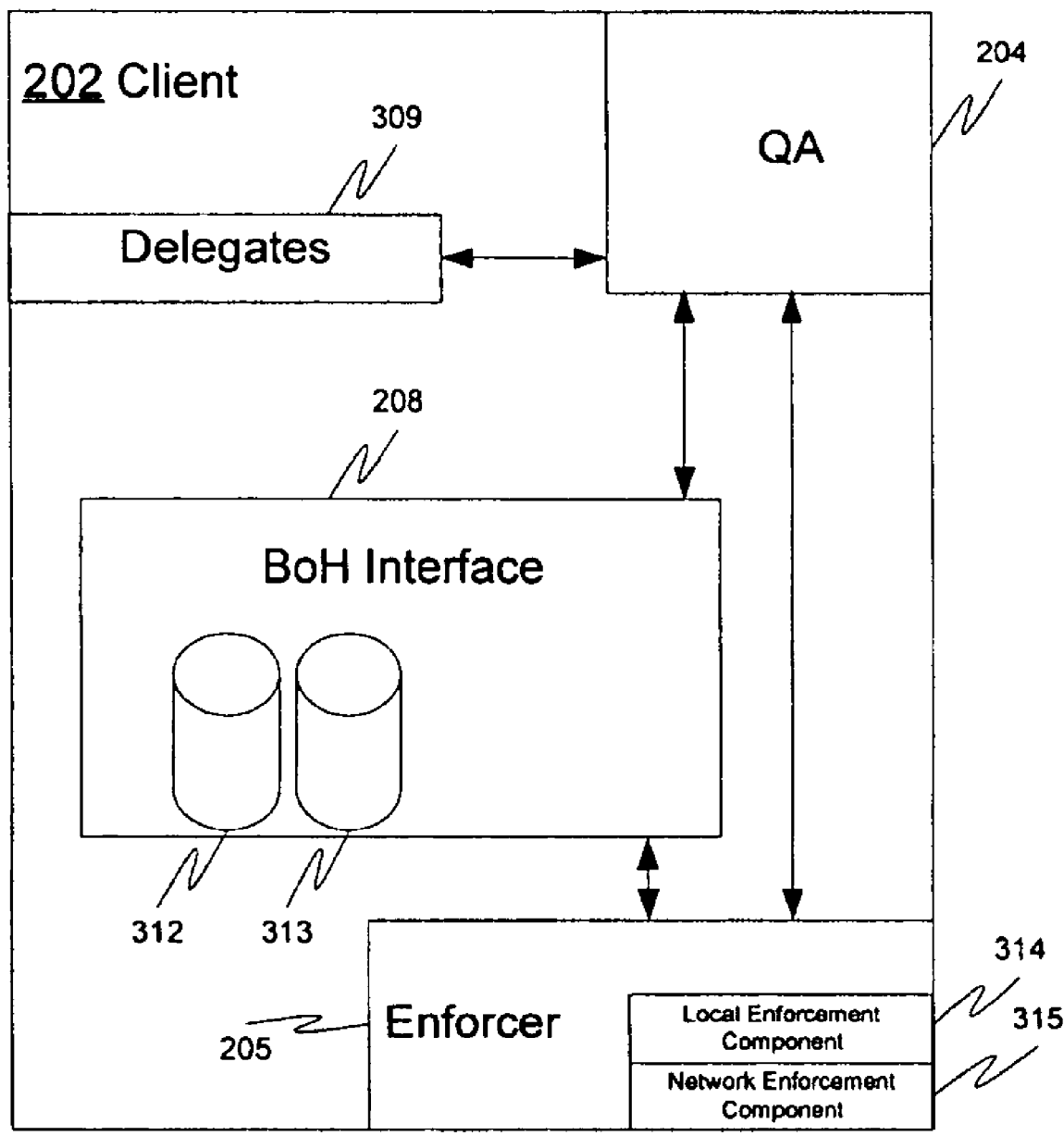
FIG. 3 illustrates a client computer of the present invention.

In one embodiment of the invention, the QA 204 is a service running on the client 202. With reference to FIG. 3, the client 202 further comprises delegates 309, and BoH interface 208 comprises Manifest/Status Report store 312 and BoH store 313. The delegates 309 are responsible for running the checks on the client 202 as outlined by the manifest. Each delegate 309 runs a script or process that may be configured or hard coded into the delegate 309, and passes the result of the check back to the QA 204, which compiles a status report based on those results. The checks performed may include, but are not limited to, whether software is installed, patch state of installed software, installed software version, the state of the firewall, registry keys and values, file system objects, file shares, services, anti-virus tools, and anti-virus signatures and states. The manifest, in addition to indicating the latest version of the QA 204, dictates which delegates 309 should be executed, and which checks should be performed. The Manifest/Status Report store 312 stores past and present versions of manifests and status reports. The BoH store 313 stores past and present versions of obtained BoHs. The BoH interface 208 provides the QA 204 and the enforcer 205 with the latest BoH from the BoH store 313. The BoH interface 208 creates the proof of BoH, explained herein.

The enforcer 205 is a component running on client 202 that includes a local enforcement component 314 and a network enforcement component 315. The local enforcement component 314 is responsible for quarantining (i.e. restricting outside access to the local machine) when client 202 is in a quarantine state. The local enforcement component 314 is used to isolate the local client 202 from other machines. This allows the client 202 to protect itself from being attacked if it finds itself insecure but not infected. The present invention isolates vulnerable as well as infected machines into an isolated quarantine network, thus the local enforcement component 314 prevents infection the insecure client 202 until the required patches are installed. An Internet Connection Firewall (ICF) is an exemplary local enforcement component 314 of the present invention. The local enforcement component 314 is called by the QA 204 when the quarantine changes state. When in quarantine, the local enforcement component 314 provides greater restriction to local access by outside machines; however, when the quarantine state changes to non-quarantine, the restriction against outside access is lessened.

The network enforcement component 315 provides an interface for communicating with the enforcement server 216 located on network server 203. The network enforcement server queries the BoH store 313 for proof of BoH, and presents the proof of BoH to enforcement server 216 in an attempt to gain access to network resources provided by network server 203. The network enforcement component 315 receives back from the enforcement server 216 an indication of whether network access is granted, and if not, why the proof of BoH failed. The enforcement server 216 on network server 203 validates the BoH for valid creation date, valid expiry date, a manifest version that is the same or greater than the local manifest version, and valid integrity check on the BoH.

FIG. 5 illustrates the BoH 500 that is issued by a QS. The BoH is a data structure that includes the creation time 501 of the BoH, the expiry time 502 of the BoH, the manifest version 503 against which the BoH was issued, and an integrity check 504 indicating that the BoH has not been tampered. Alternatively, the BoH also contains a network globally unique identifier (GUID) 505 for which the BoH was issued. In one embodiment, the BoH is implemented as an X.509 certificate. In this embodiment, the Subject Alternative Name of the X.509 certificate contains a machine account name for which the BoH was issued.

Figure 6:
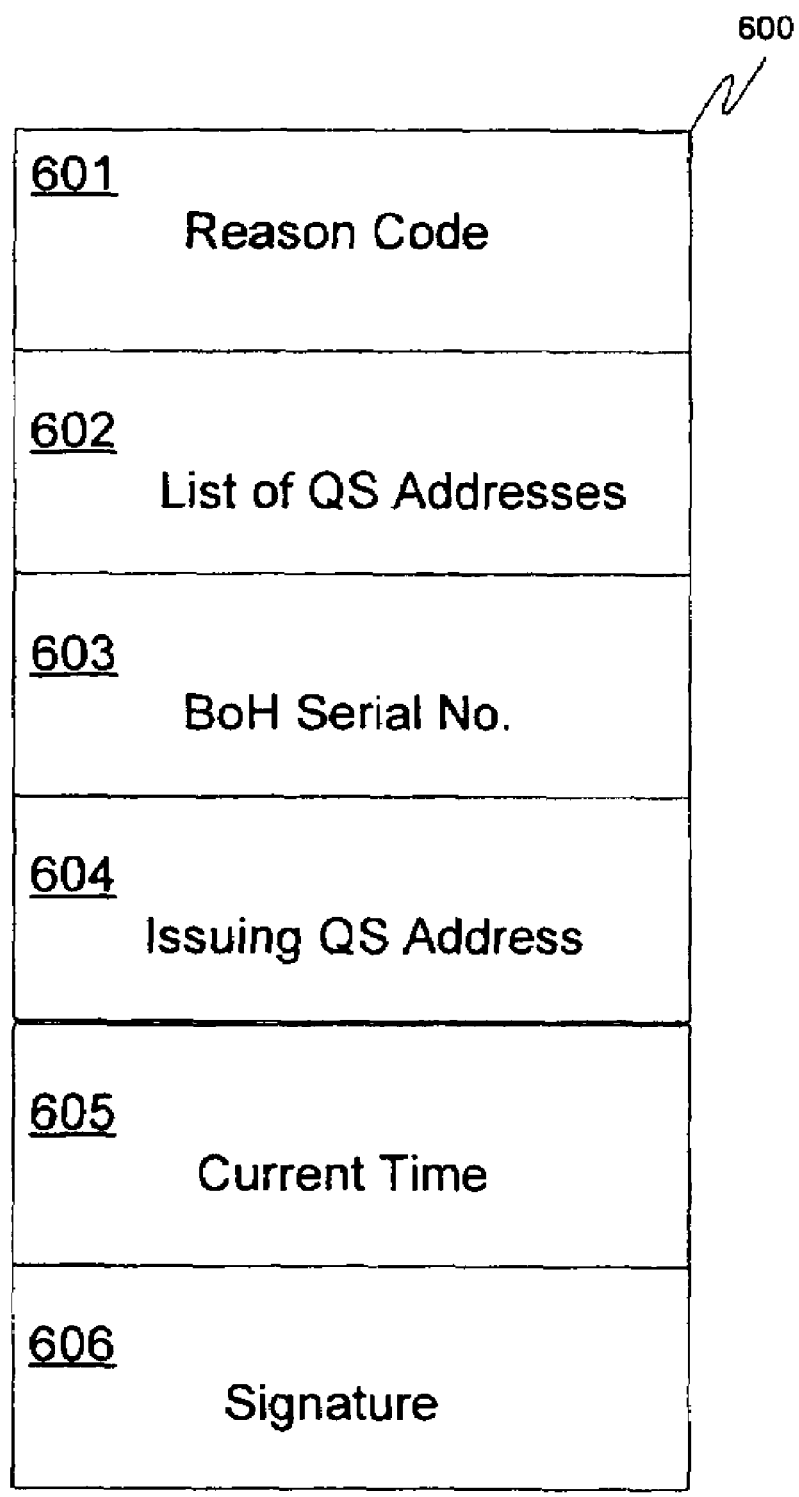
FIG. 6 illustrates a proof of bill of health data packet of the present invention.

FIG. 6 illustrates the proof of BoH 600 that is exchanged between the client 202 and the network server 203 (FIG. 2). The proof of BoH 600 is a data packet that includes a reason code 601, a list of QS addresses 602, a BoH serial number 603, the issuing QS address 604, the current time 605, and a signature 606 using the private key encryption of the BoH. The signature is an RSA or DSS encrypted signature using the private key of a public/private key pair. If the proof of BoH 600 is sent as a request for network resources, the reason code 601 is set to "request," the BoH serial number 603 is set to the serial number of the client's BoH, and the issuing QS address 604 is set to the address of the QS that issued the BoH. The list of QS addresses 602 contains zero or more address of QSs, and the current time 605 is set to the current time on the client. If the proof of BoH 600 is sent as a response to a request for network resources, the reason code 601 is set to one of "OK," "Invalid BoH," "Invalid Manifest Version," and "Invalid Time." The BoH serial number 603 is set to the serial number of the network server's BoH, and the issuing QS address is set to the address of the QS that issued the network server's BoH. The list of QS addresses 602 contains zero or more QS addresses, and the current time 605 is set to the current time of the network server. The signature uses the private key encryption of the network server's BoH.

Figure 4:
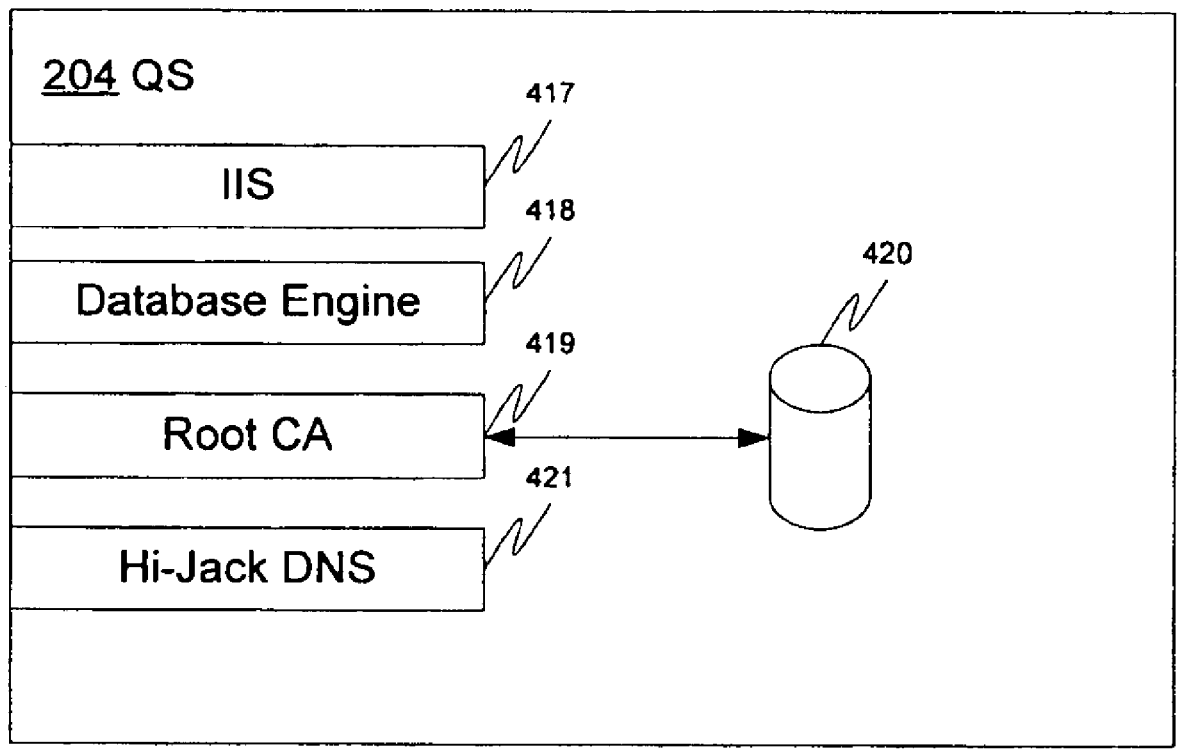
FIG. 4 illustrates a quarantine server of the present invention.

With reference to FIG. 4, the QS 201 includes an Internet Information Service (IIS) 417 for providing a default web page. When client 202 is in quarantine and a user opens a web browser on client 202, QS 201 provides a web page to inform the user that the client 202 is in quarantine and corrective action must be taken. The IIS 417 further provides an install package for installing the QA 204, as well as latest versions of enforcers 205, delegates 309 (FIG. 3), and manifests. The user may download the software provided by the IIS 417, or if the QA 204 is already installed, the QA 204 downloads the newest software automatically. The QS 201 further includes a database engine 418 for storing manifests, status reports, failure reports, and QA root certificates. Status reports received from QAs are stored in the database engine 418, as are failure reports received from network servers 203 that indicate instances where a BoH was not validated. The QS 201 communicates with network servers 203 to provide them with information for validating BoHs received from clients 202. Still further, the QS 201 includes a root certificate authority 419 for issuing root certificates, and a certificate store 420 for storing root certificates, web server certificates, and BoHs. The QS 201 also includes a hijack DNS component 421 for intercepting DNS queries from quarantined clients. In an alternative embodiment of the invention, the QS 201 is installed on the same physical machine as the network server 203.

Figure 7:
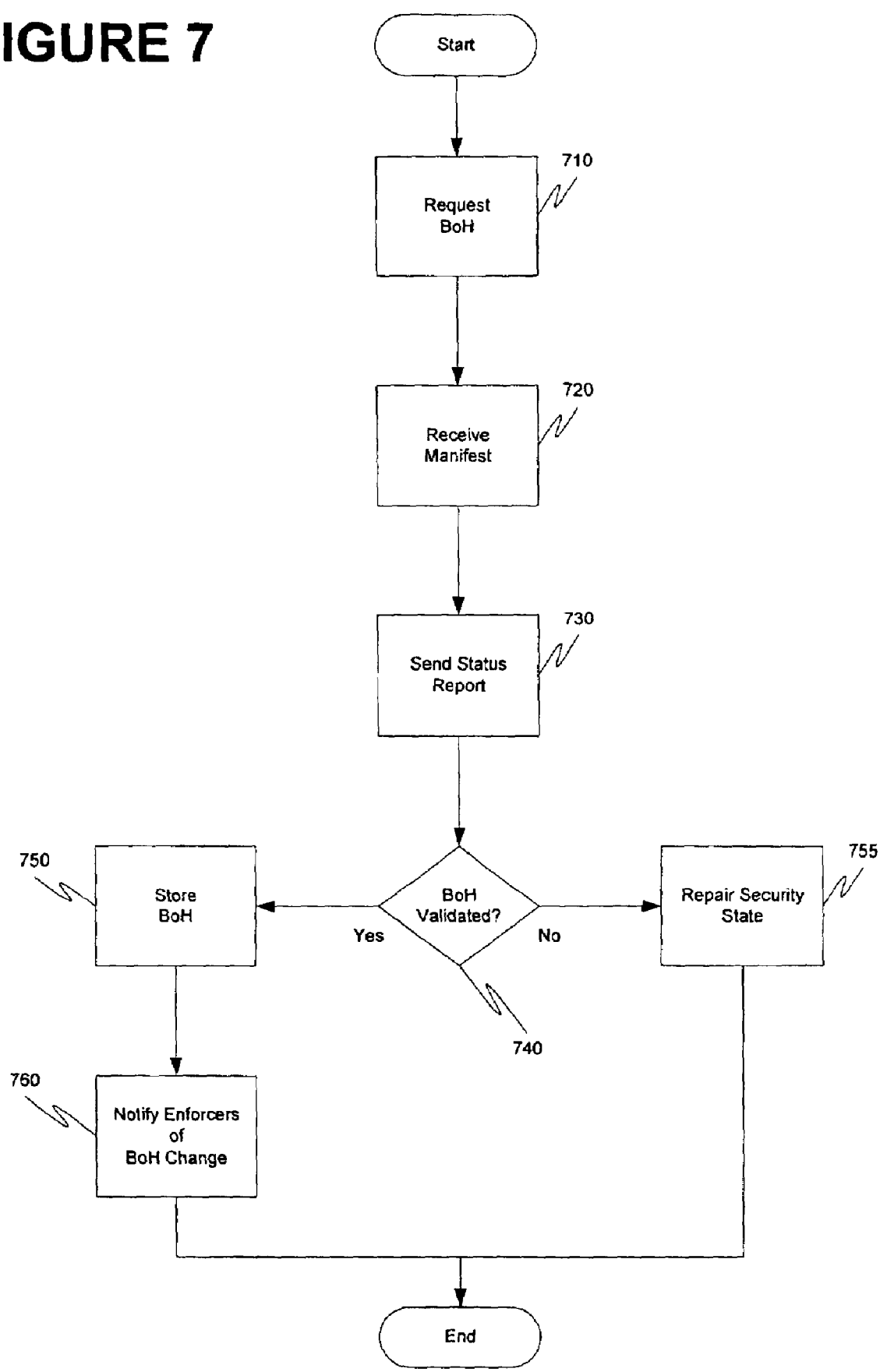
FIG. 7 is a flow diagram depicting the operation of the client when acquiring a bill of health.

With reference to FIGS. 3 and 7, the operation of the client 202 is now described with respect to acquiring a BoH. When the QA is initialized with a QS for the first time, the client user is asked to trust the QS. The QA and QS then establish a secure sockets layer (SSL) channel, and exchange root certificates. At step 710, the client 202 is in a quarantine state, so the QA 204 issues a BoH request to a QS. This request may be prompted by a notice from enforcer 205 that the current BoH was rejected, because the QA 204 periodically updates the BoH, or because the client 202 has no BoH at all. At step 720, the QA 204 receives the manifest from the QS. The manifest is encrypted with the private key of the QS. The QA 204 passes the manifest to the delegates 309, which execute the checks in the manifest and return their results to the QA 204. At step 730, the QA 204 sends the status report to the QS. If a validated BoH is received by the QS at step 740, the QA 204 passes the BoH to the BoH interface 208 for storage in the BoH store 313 at step 750. At step 760, the QA 204 notifies the enforcers 205 that the BoH store 313 has changed. If a BoH is not received at step 740, then client 202 did not pass all of the manifest checks, and further action must be taken at step 755 to repair the client 202 by downloading the necessary patches and software.

Alternatively, if a status report already exists it may be sent with the BoH request at step 710. If the status report passes, the QA 204 receives a challenge from the QS to verify that the QA 204 is legitimate. If the QA 204 fails the challenges, the QA 204 receives a manifest from the QS as at step 720. If the QA 204 passes the challenge, it receives a BoH and proceeds to step 750. The QA 204 will also periodically update its manifest. To update the manifest, the QA 204 sends the QS its most recent BoH. The QS checks the manifest version of BoH and determines whether it is the most recent version. If so, the QS returns an "OK." If the BoH was not generated from the most recent manifest, the QS returns a "Failed" along with the current manifest.

Figure 8A:
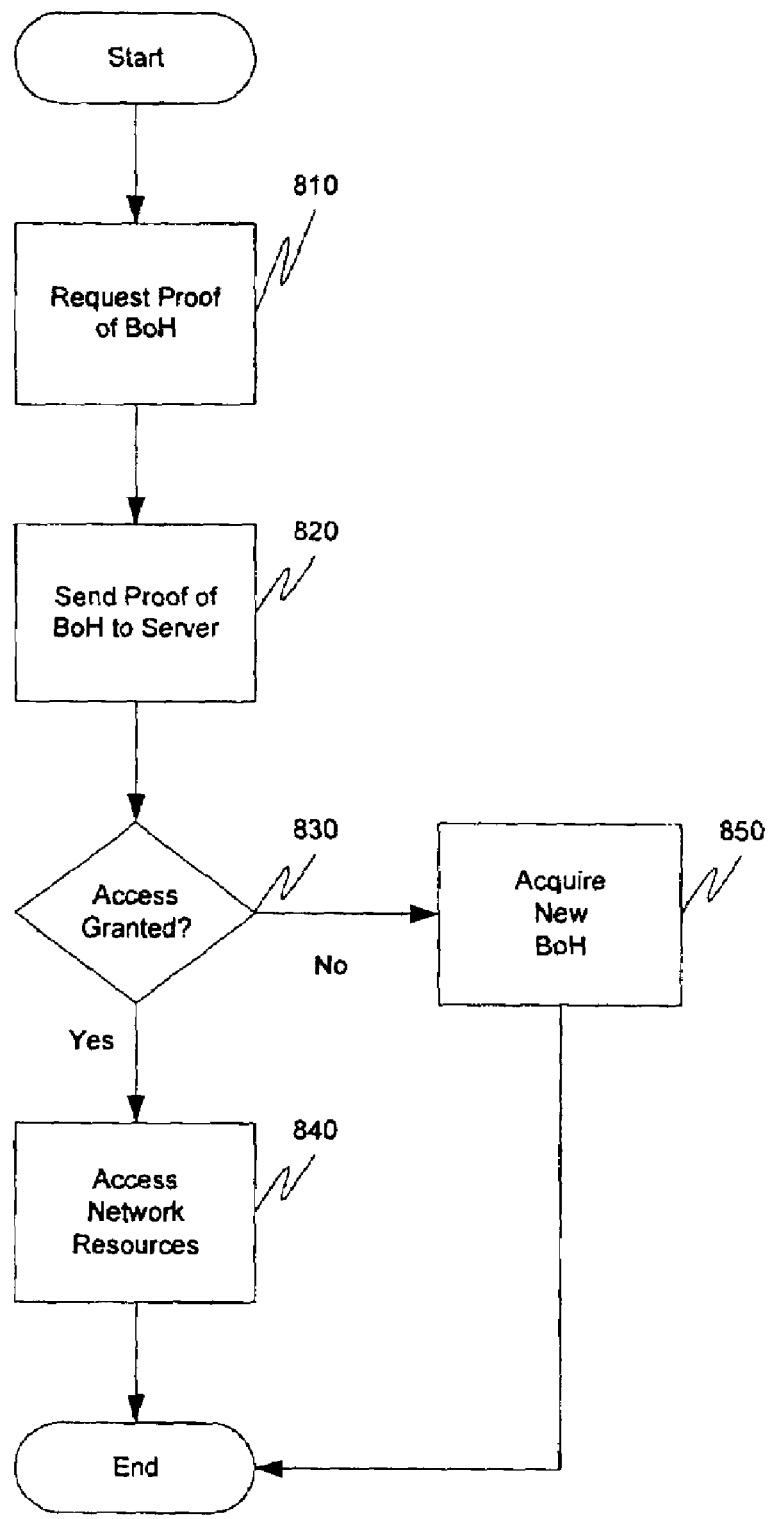
FIG. 8A is a flow diagram depicting the operation of the client when attempting to access network resources.

With reference to FIGS. 3 and 8A, the operation of the client 202 is now described with respect to accessing network resources of network server 203. At step 810, the enforcer 205 requests a proof of BoH from BoH interface 208. At step 820, the enforcer sends the proof of BoH along with a request for network resources to network server 203. If the proof of BoH was valid and the network server grants access at step 830, then the client 202 accesses the network resources at step 840. If the network server does not grant access at step 830, either because the proof of BoH was invalid or there was no proof of BoH, then the client 202 acquires a new BoH at step 850, as described previously.

Figure 8B:
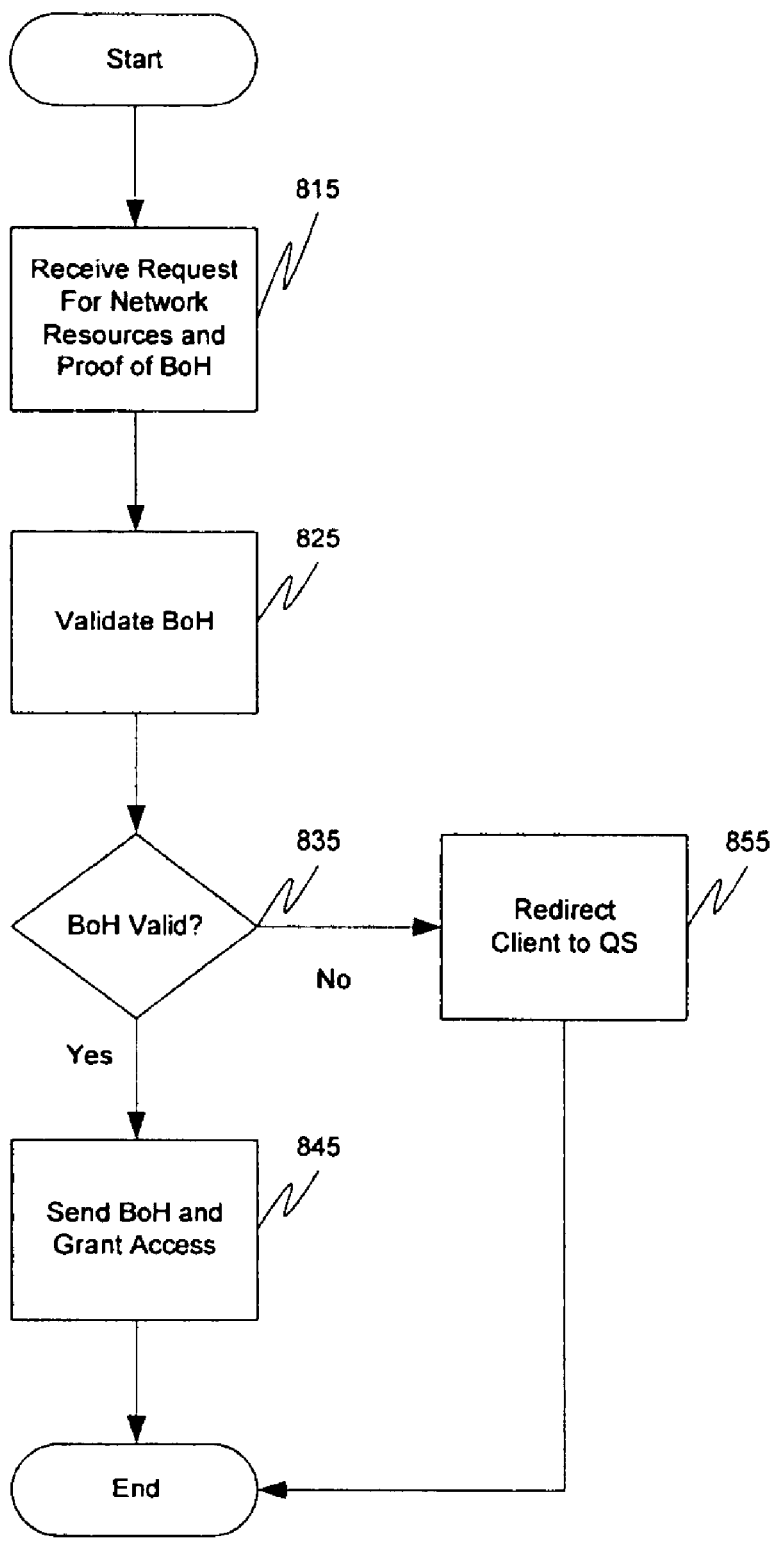
FIG. 8B is a flow diagram depicting the operation of the network server when a client is attempting to access network resources.

With reference to FIGS. 3 and 8B, the operation of the network server is now described with respect to granting access to client 202. At step 815 the enforcement server 216 receives a request for network resources along with a proof of BoH from client 202. The proof of BoH is validated by the BoH Interface 208 at step 825. In validating the proof of BoH, the BoH Interface compares the BoH to cached BoHs. If the received BoH does not match one in a cache, a copy of the BoH is requested from the QS 201. If the copy matches the received BoH, or if the received BoH was found in the cache, the BoH is validated. Otherwise, it is not. At step 835, the enforcement server 216 determines from the BoH Interface 208 whether the BoH was validated. If the BoH was validated, the enforcement server 216 sends its own proof of BoH to client 202, and grants network resources at step 845. If the BoH was not validated, the enforcement server 216 sends its own proof of BoH, and redirects the client 202 to the QS 201 at step 855.

Figure 9:
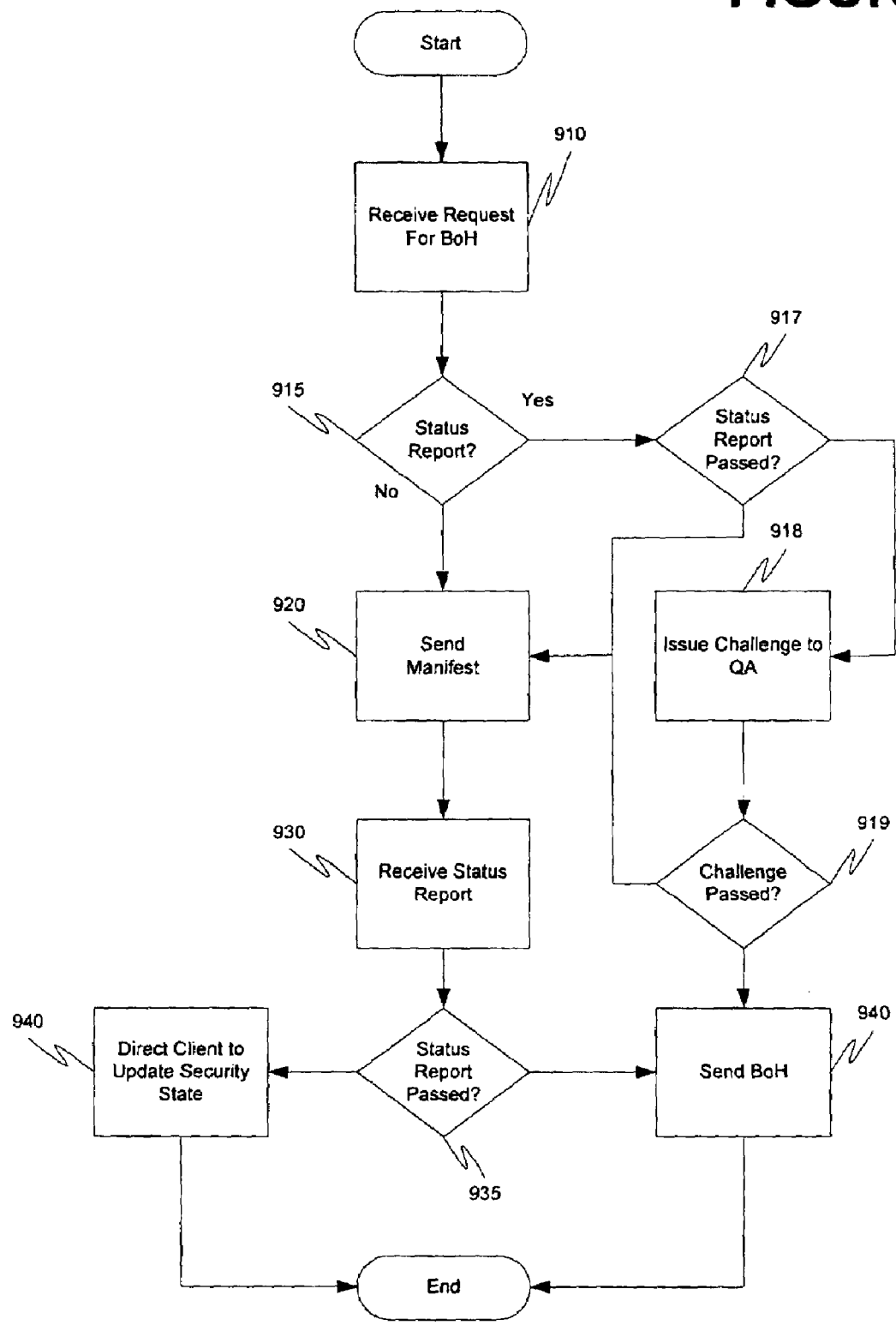
FIG. 9 is a flow diagram depicting the operation of the quarantine server.

With reference to FIGS. 4 and 9, the operation of the QS 201 is now described. At step 910, QS 201 receives a request for a BoH. The QS 201 determines whether the request includes a status report at step 915. If a status report was included, the QS 201 determines at step 917 whether the status report passes—i.e., did the client pass all of the checks contained in the most recent manifest. If the status report did pass, the QS 201 issues the client a challenge at step 918 to determine whether the client's QA is legitimate. The QS 201 determines whether the client passed the challenge at step 919. If the client passed the challenge, the QS proceeds to step 940. If the client didn't pass the challenge or the status report, or if there was no status report, the QS proceeds to step 920. At step 920, the QS 201 sends the most recent manifest stored in the database engine 418 to the requesting client, encrypted using the QS's private key. At step 930, the QS 201 receives a status report detailing the results of the checks mandated by the manifest. The QS 201 determines whether the status report passed at step 935. If the status report passed, the QS 201 generates a BoH, encrypts it with its public key, and sends it to the client at step 940. If the status report failed, the QS 201 directs the client regarding how to update the client's system at step 950.

The implementation of the invention varies depending upon the protocol used by the enforcer 205 and enforcement server 216 (FIG. 2). The enforcement protocols supported by the invention include, but are not limited to, Dynamic Host Configuration Protocol (DHCP), virtual private networks (VPN), 802.1X protocol, and IP Security Protocol (IPsec).

Figure 10:
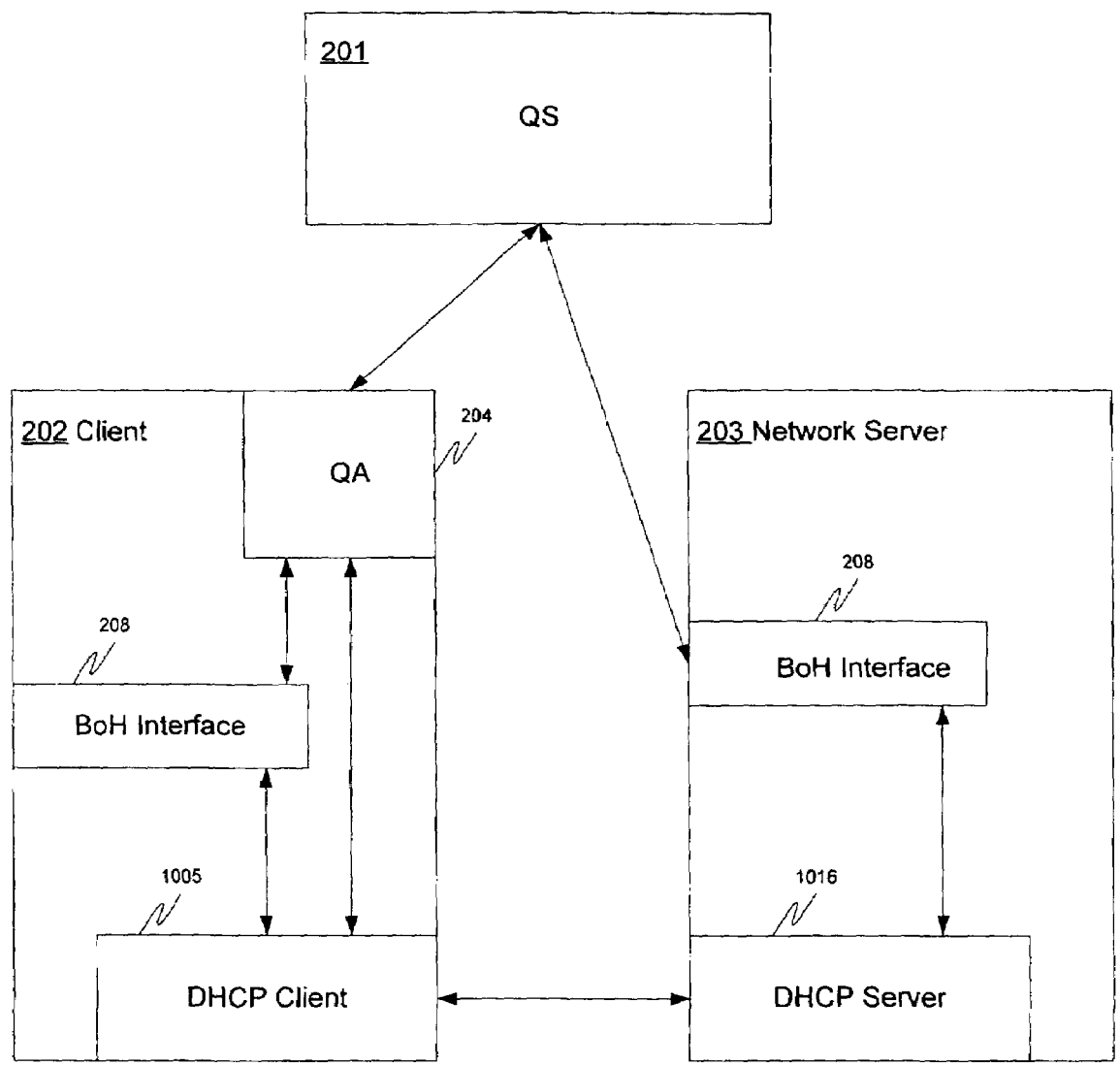
FIG. 10 is a schematic overview of the invention where Dynamic Host Configuration Protocol (DHCP) is used.

In one embodiment, the enforcer 205 is implemented as a DHCP client, and the enforcement server is implemented as a DHCP server. FIG. 10 illustrates an overview of this embodiment, including the client 202, QA 204, QS 201, network server 203, and BoH interface 208 as previously described. FIG. 10 also illustrates client 202 comprising DHCP client 1005 as an enforcer, and network server 203 comprising DHCP server 1016 as an enforcement server. DCHP client 1005 requests a lease from DHCP server 1016 so that it may have access to a network through network server 203. DHCP server 1016 provisions DCHP client 1005 with an IP address, default gateway, subnet mask, DNS, and static routes.

Figure 11:
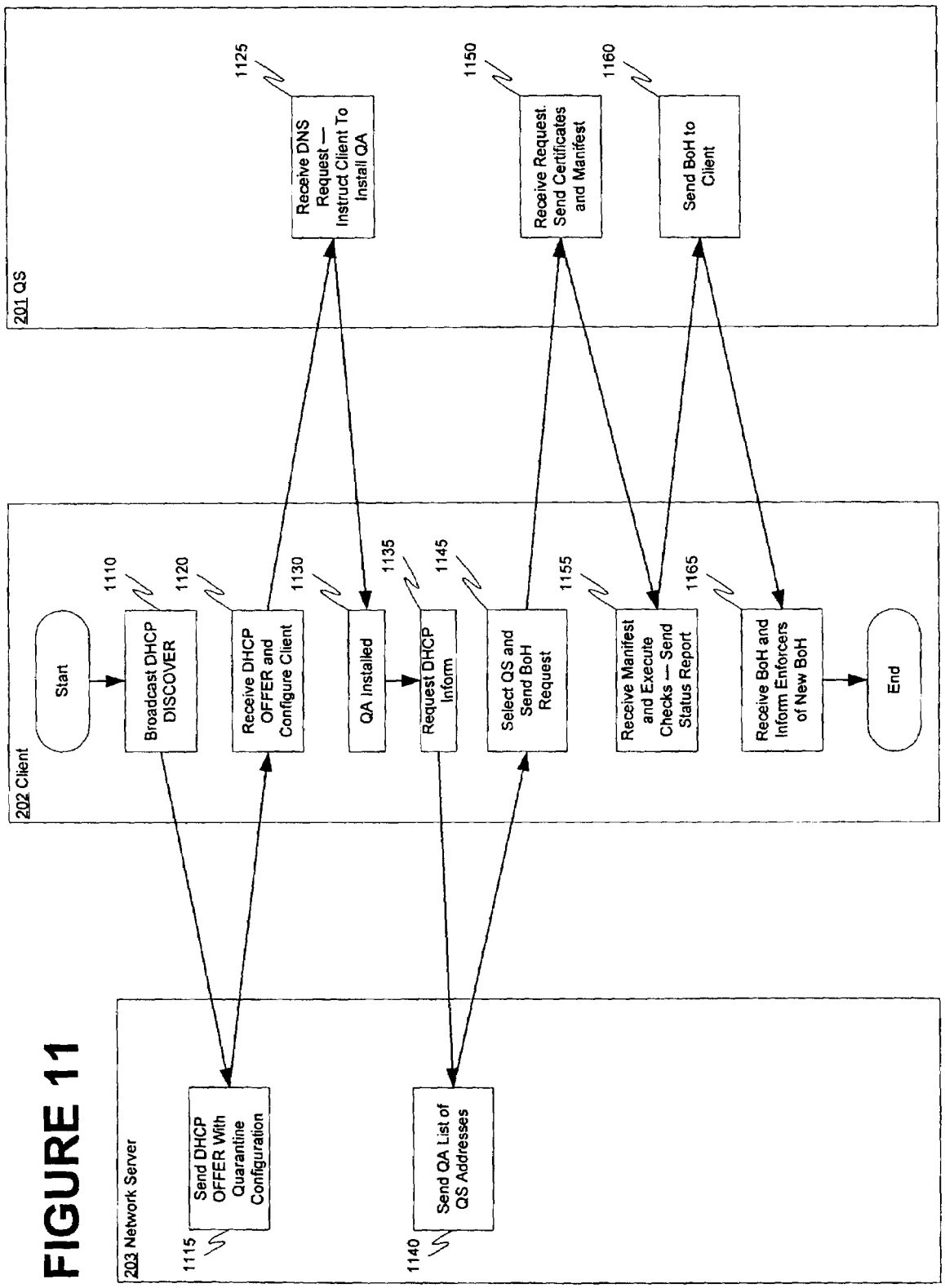
FIG. 11 is flow diagram of the operation of the invention where DHCP is used.

With reference to FIG. 11, the operation of the present embodiment is now described. When client 202 boots it attempts acquire access to the local network through network server 203. However, when the client 202 does not have a QA installed, it cannot supply a BoH to network server 203. Thus, at step 1110 client 202 broadcasts a DHCP DISCOVER message to the local network without a proof of BoH as a DHCP option in the message. The message is received by the DHCP server 1016 in the network server 203. When the DHCP server 1016 recognizes that no proof of BoH is presented, DHCP server 1016 supplies a DCHP OFFER message to client 202 at step 1115. This DHCP OFFER message contains a lock-down configuration and a proof of BoH for the network server 203. The lock-down configuration includes the IP address of a QS as the DNS address in the DHCP OFFER. At step 1120, the client 202 receives the DHCP OFFER message and the DCHP client 1005 configures the client 202 with the information in the DHCP OFFER message, such that when a user of client 202 opens a web browser, the DNS request goes to QS 201. At step 1125, QS 201 receives the DNS request and supplies the client 202 with a default web page on QS 201 that requests the user to trust the web site and instructs the user of the client 202 to install a QA by clicking on a link to the QA. The install package for the QA may be located on the QS 201, or on an external fix-up server (not shown).

At step 1130, the QA is installed on the client 202. Recognizing that the client 202 does not possess a BoH, at step 1135 the QA 204 requests that DHCP client 1005 to issue a DHCP INFORM message to acquire the IP address of a QS. At step 1140, DHCP server 1016 provides the client 202 with a list of QSs. At step 1145, the QA 204 selects a QS from the list at random, for example QS 201, and requests a BoH. At step 1150, the QS receives the request and sends its root certificates and the latest version of the manifest. At step 1155, the client 202 receives the manifest, executes all of the checks, and provides QS 201 with a status report requesting a BoH. Assuming the status report passes, the QS 201 provides the client 202 with a BoH at step 1160. The client 202 receives the BoH at step 1165, and informs its DHCP client 1005 that a new BoH has been received.

Figure 12:
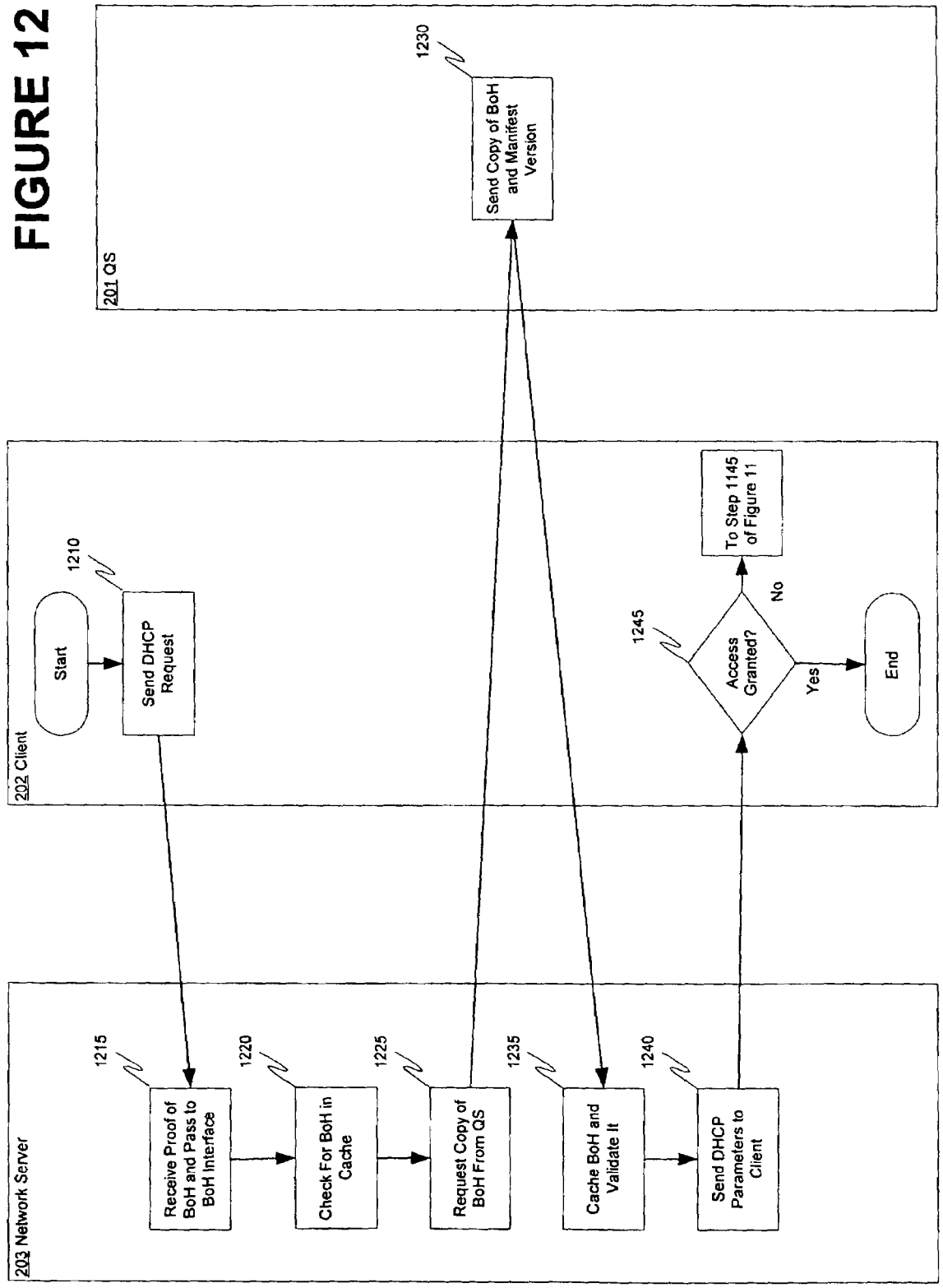
FIG. 12 is another flow diagram of the operation of the invention where DHCP is used.

With reference to FIG. 12, the discussion is continued. At step 1210, the DHCP client recognizes that a new BoH has been received, and sends a DHCP REQUEST message requesting a new lease, with the proof of BoH encoded in the message as a DHCP option. At step 1215, the DHCP sever 1016 on network server 203 receives the DHCP request and finds the proof of BoH option. The DHCP server 1016 passes the proof of BoH to the BoH interface on network server 203, which gets the BoH serial number and issuing QS and checks in a local cache of received BoHs for the BoH at step 1220. Assuming the BoH is not found in the cache, the network server 203 requests the BoH from the QS 201. The QS 201 sends network server 203 the BoH along with the manifest version for the BoH at step 1225. At step 1230, the network server 203 receives the BoH, caches it, validates the proof of BoH from the client 202 using the BoH from the QS 201, and compares the manifest version numbers of the two BoHs. If the validation and comparison fails, then the DHCP server 1016 returns a lock-down configuration along with the BoH of the network server 203 to DHCP client 1005. If the validation and comparison passes, the DHCP server 1016 returns a normal set of IP parameters that grant the DHCP client access to the network through network server 203, along with the BoH of the network server 203. At step 1235, the DHCP client 1005 receives the DHCP parameters and configures client 202 accordingly. At step 1240, client 202 determines whether network access was granted. If network access was granted, the quarantine is released. If network access was not granted, client 202 proceeds to step 1145 of FIG. 11 so that a new BoH may be obtained.

The lock-down configuration is a set of system settings that are sent via DHCP to any machine deemed unsafe, i.e. quarantined. The purpose is to prevent the unsafe machine from talking to any other network node except for the few select servers it can use to update its compliance with network security policy. This is done by setting the configuration options outlined below and relying on the TCP/IP stack to perform the enforcement.

In the DHCP OFFER message, the IP address (which is assigned to the client) is set to the next available IP in matching scope. Quarantine IP address assignment follows the same process as normal address assignment. The IP address given out is the next available address out of the matching scope. Therefore, both quarantined and safe machines, on the same physical network, are on the same logical network. The subnet mask, contained in the DHCP OFFER message at option code 1, is set to a Value of 255.255.255.255. This defines the network to one machine, the client, and prevents it from resolving addresses of other machines on the same logical network. This prevents the quarantine machine from finding the IP addresses of other quarantined or healthy clients. The default route, contained in the DHCP OFFER message at option code 3, is set to a value of 0.0.0.0 so that any attempt to send a packet to another machine, except explicitly defined ones, will fail. The DNS, contained in the DHCP OFFER message at option code 6, is set to the IP address of the hi-jack DNS of the QS. Whenever the client performs name resolution on any address, it will receive the IP of QS. This way any client will be redirected to fix-up page on QS. Static routes, as contained in option code 33 of the DHCP OFFER message, include the QS IP, fix-up server IPs (if any exist), and a web proxy IP. Static routes are necessary to allow connectivity to servers for getting corporate security policy manifest to the QA, updating the client with latest settings, bootstrapping the client with a QA, and getting internet connectivity. All of the IP settings and routes are configured by IT administrator.

There is one quarantine-specific DHCP option defined to support token exchange. Tokens are used to represent the proof of BoH and are provided to the DHCP client by the QA. They are treated by the DC as a binary blob, obtained from QA, that is encoded in the Encapsulated Vendor-Specific Extensions Option (43). The DHCP client sends the token to the DHCP server as part of the DHCP DISCOVER, DHCP REQUEST or DHCP INFORM messages. The DHCP server validates the token and sends an error code back to the DHCP client. The DHCP client then reports the error code to the QA.

Figure 15A:
FIG. 15A illustrates an exemplary DHCP option.

Generic DHCP option consists of Option Code, Length and Data fields, as illustrated in FIG. 15A. New token option will be encoded using Encapsulated Vendor-Specific Extensions Option (43) and be used in conjunction with Vendor Class Identifier (60). The token option will be used for 2 purposes: to encapsulate the security token and allow it to be sent in a DHCP message to the DHCP server, and to carry the error code from the DHCP server to QA via the DHCP client. Both option 60 and 220 will need to be included in a DHCP message. Option 60 will indicate to our server that set of options packaged within Option 43 are ours. Server will then parse option 43 and retrieve Option 220 data.

Figure 15B:
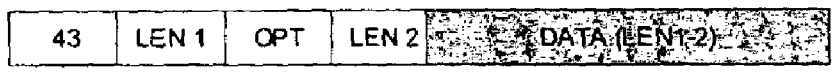
FIG. 15B illustrates an exemplary Encapsulated Vendor-Specific Extension option 43.
Figure 15C:
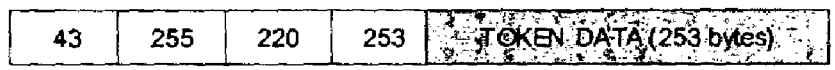
FIG. 15C illustrates a token in a DHCP message.
Figure 15D:
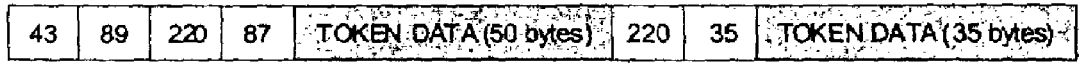
FIG. 15D illustrates two tokens in a DHCP message.

The definition of Encapsulated Vendor-Specific Extensions Option (43) is shown in FIG. 15B, where OPT=Option Code and LEN=Byte length of data. For tokens less than 253 single instance of Option 43 are required. An example of how a token of size 200 would be encoded is shown if FIG. 15C. Multiple tokens can also be packaged in the DHCP message. This is done by having multiple Option 220 instances within Option 43. An example of 2 tokens, 50 and 35 bytes each, is shown in FIG. 15D.

When the quarantine system is installed on the DHCP server, the administrator is queried for an IP address of a QS. The DHCP server then sets up communication with the QS and confirms trust with the administrator. Alternatively, the DHCP relies on credentials presented by the QS. The DHCP server requests the QS for a list of root certificates, and adds those certificates to a store. The DHCP server then requests IP address for QSs, as well as a BoH. The DHCP also queries the QS whether DHCP quarantining is enabled on the QS. The DHCP server is then configured to supply a proof of BoH in a BoH option, and to validate a proof of BoH contained in a BoH option, as well as return the lock-down (quarantine) configuration if a BoH validation fails.

Figure 13:
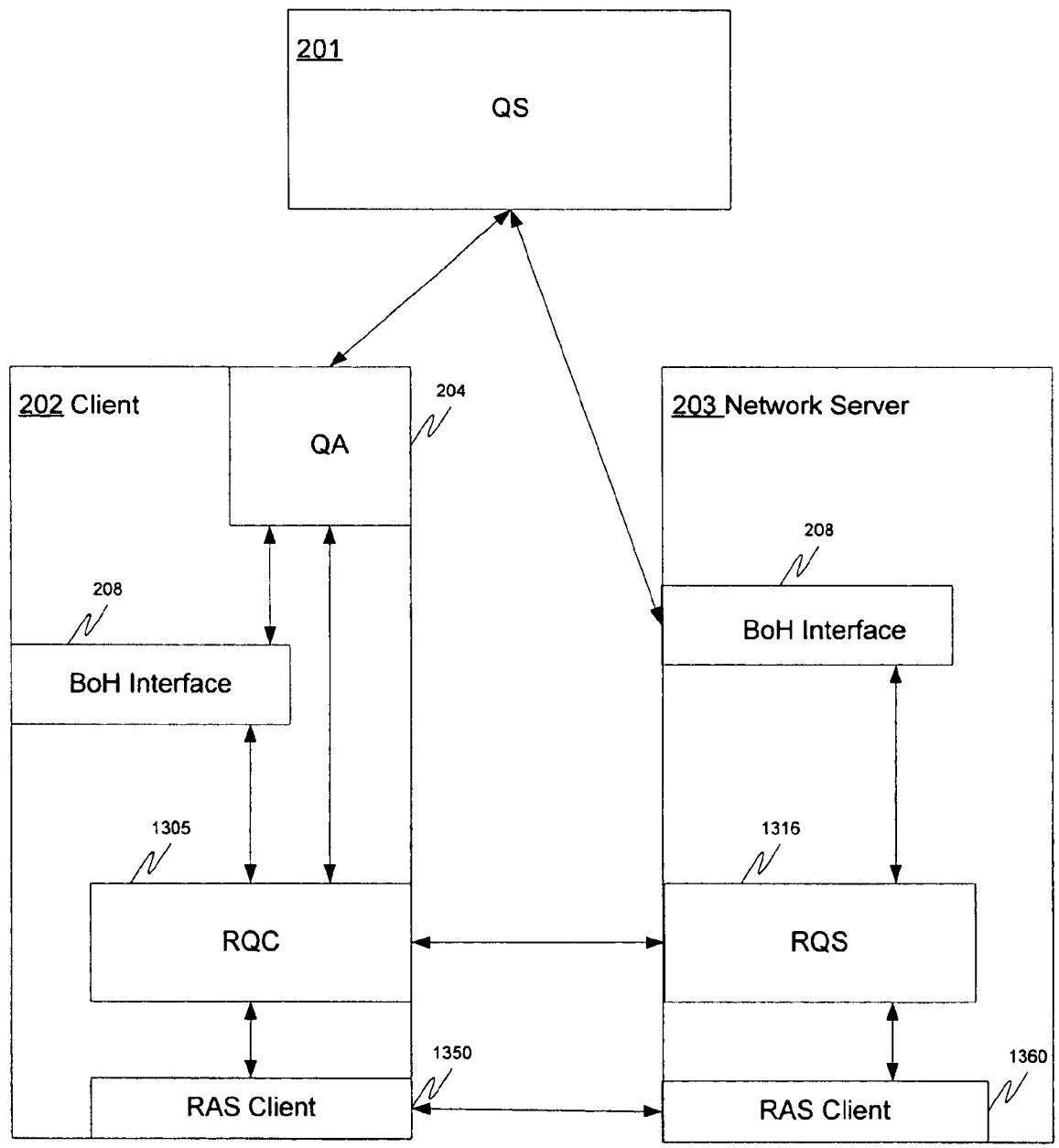
FIG. 13 is a schematic overview of the invention where Virtual Private Networking (VPN) is used.

In another embodiment where the invention in used in a VPN environment, the enforcer is implemented as a Remote Access Quarantine Client (RQC), and the enforcement server is implemented as a Remote Access Quarantine Server (RQS). FIG. 13 illustrates an overview of this embodiment, including the client 202, QA 204, QS 201, network server 203, and BoH interface 208 as previously described. FIG. 13 also illustrates client 202 comprising RQC 1305 as an enforcer, and network server 203 comprising RQS 1316 as an enforcement server. FIG. 13 further illustrates the client 202 comprises a Remote Access Service (RAS) client 1350, and network server 203 comprises RAS server 1360. The RAS client 1350 and the RAS server 1360 establish a VPN between the client 202 and the network server 203. The RAS server 1360 establishes an IP filter to filter packets incoming from the client 202 until a proof of BoH has been presented and validated.

The RAS client 1350 attempts to establish a VPN and notifies the RQC 1305 of the attempt. The RQC 1305 sends a request for network services to RQS 1316, along with a proof of BoH if client 202 possesses one. If the BoH is invalid, or if no proof of BoH is presented, RQS 1316 returns the address of a QS, thereby redirecting the client 202 to a QS. If the BoH is validated, the RQS 1316 sends the client 202 its own proof of BoH, and informs the RAS server 1360 to remove the IP filter and allow the VPN connection. Acquisition and validation of BoHs is explained in the description of FIGS. 7 and 8.

In another embodiment where the invention in used in an alternative VPN environment, the enforcer and enforcement servers are implemented as Protected Extensible Authentication Protocol (PEAP) clients. Protected Extensible Authentication Protocol (PEAP) is a member of the family of Extensible Authentication Protocol (EAP) protocols. Extensible Authentication Protocol (EAP) is an extension to the Point-to-Point Protocol (PPP) that allows for arbitrary authentication mechanisms to be employed for the validation of a PPP connection. PEAP uses Transport Level Security (TLS) to create an encrypted channel encrypted channel between an authenticating PEAP client, such as a wireless computer, and a PEAP authenticator, such as an Internet Authentication Service (IAS) or Remote Authentication Dial-In User Service (RADIUS). PEAP does not specify an authentication method, but provides additional security for other EAP authentication protocols, such as EAP-MSCHAPv2, that can operate through the TLS encrypted channel provided by PEAP.

FIG. 13 illustrates an overview of this embodiment, including the client 202, QA 204, QS 201, network server 203, and BoH interface 208 as previously described. FIG. 13 also illustrates client 202 comprising PEAP client 2105 as an enforcer, and network server 203 comprising PEAP client 2116 as an enforcement server. FIG. 13 further illustrates the client 202 comprises a Remote Access Service (RAS) client 2150, and network server 203 comprises RADIUS server 2160. Furthermore, this embodiment includes VPN server 2170 including RAS server 2171. The RAS client 2150 attempts to establish a VPN connection with the RAS server 2171. However, to avoid modifying the VPN server 2170, the BoH is authenticated using PEAP through the RADIUS server 2160. The RAS server 2171 establishes an IP filter to filter packets incoming from the client 202 until a proof of BoH has been presented and validated by the network server 203, and the RADIUS server 2160 notifies the RAS server 2171 through RADIUS protocol that the IP filter can be lifted.

The RAS client 1350 attempts to establish a VPN and notifies the PEAP client 2105 of the attempt. The PEAP client 2105 sends a request for network services to PEAP client 2116, along with a proof of BoH if client 202 possesses one. If the BoH is invalid, or if no proof of BoH is presented, PEAP client 2116 returns the address of a QS, thereby redirecting the client 202 to a QS. If the BoH is validated, the PEAP 2116 sends the client 202 its own proof of BoH, and forwards the proof of BoH of the client 202 to the RADIUS server 2160. The RADIUS server 2160 then informs the RAS server 2170 via RADIUS protocol to remove the IP filter and allow the VPN connection. Acquisition and validation of BoHs is explained in the description of FIGS. 7 and 8. Moreover, this embodiment permits the VPN server 2170 to be replaced by an 802.1X compliant device. Thus, the 802.1X device will not authenticate a supplicant (client 202) until the supplicant has presented valid credentials, and the RADIUS server 2160 has informed the 802.1X device that the supplicant has a valid BoH.

Figure 14:
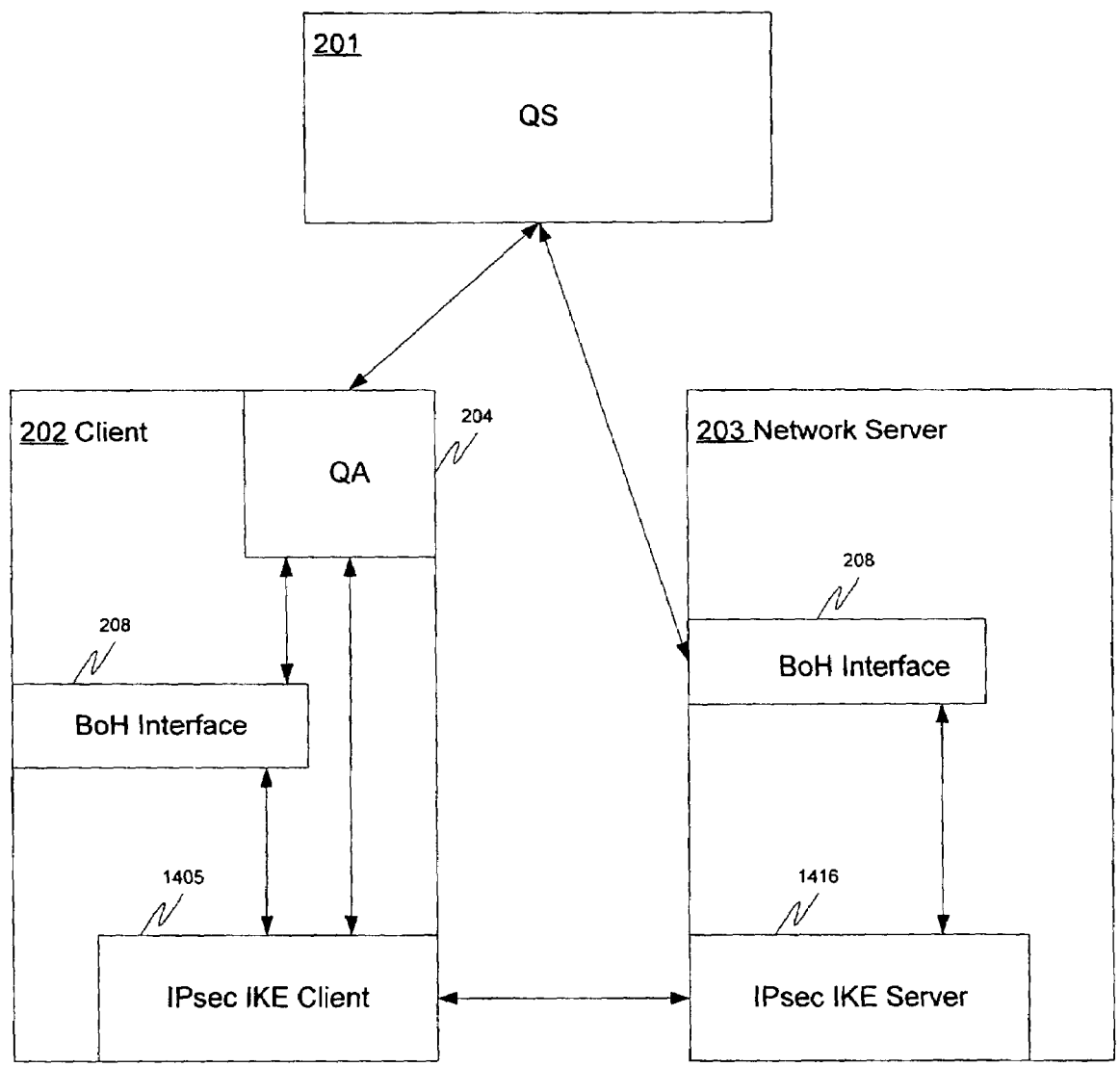
FIG. 14 is a schematic overview of the invention where Internet Protocol Security is used.

In another embodiment where the invention is implemented using IPsec, the enforcer 205 and enforcement server 216 use IPsec Internet Key Encryption (IKE). FIG. 14 illustrates an overview of this embodiment, including the client 202, QA 204, QS 201, network server or peer 203, and BoH interface 208 as previously described. FIG. 14 also illustrates client 202 comprising IPsec IKE enforcer 1405 as an enforcer, and network server 203 comprising IPsec IKE enforcer 1416 as an enforcement server. In this embodiment, the IPsec policy of the client 202 and the peer 203 is modified to require a validated proof of BoH before access is granted to each other's network resources. Acquisition and validation of BoHs is explained in the description of FIGS. 7 and 8.

Figure 16:
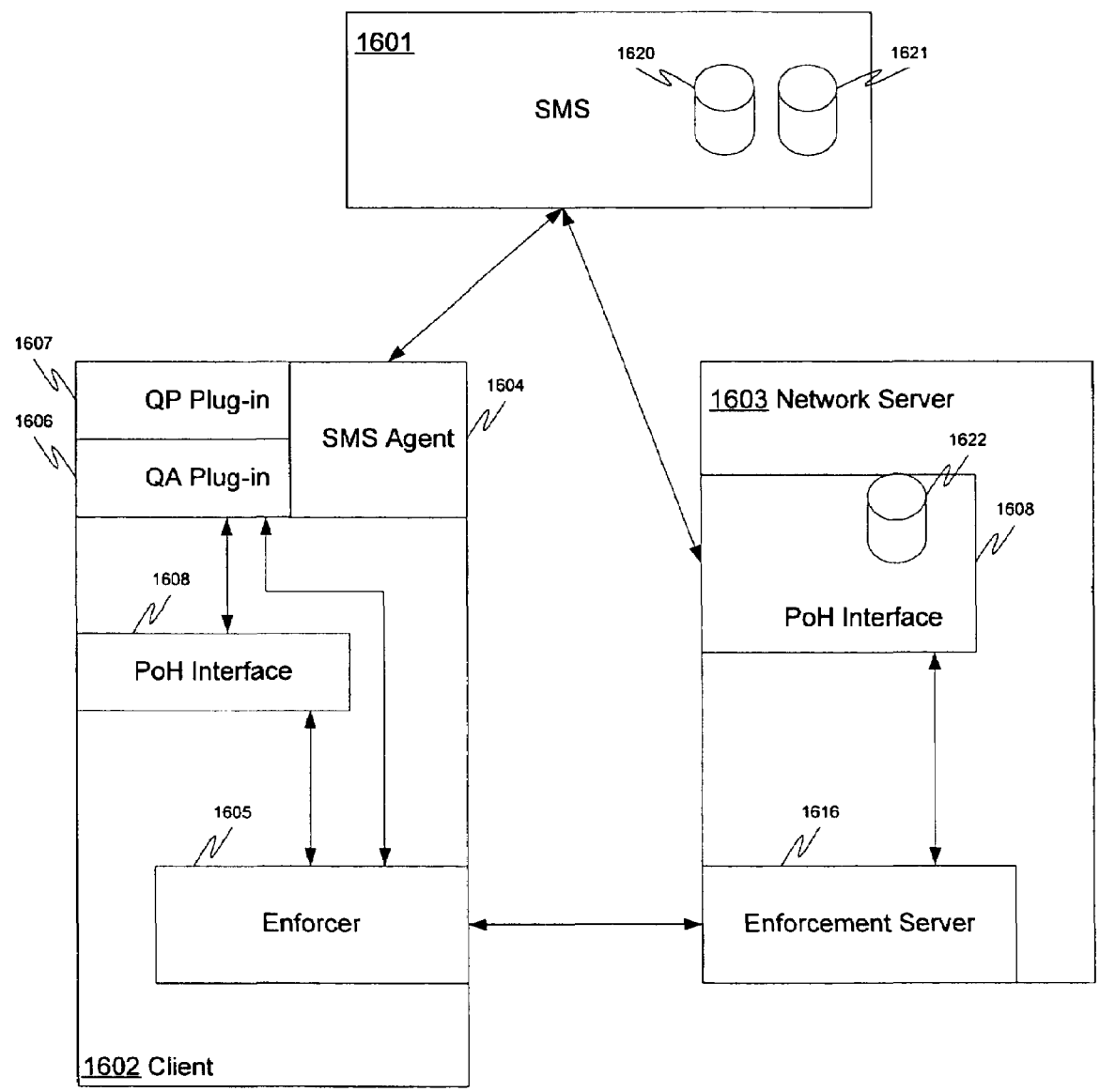
FIG. 16 is a schematic overview of the invention where Systems Management Server (SMS) is used.

FIG. 16 illustrates yet another embodiment of the invention, in which the QS is replaced with a Microsoft® Systems Management Server (SMS). However, any server performing the functions of the SMS described herein is considered to be equivalently embodied in the present invention. SMS helps ensure that software used by clients complies with corporate guidelines, requirements, or standards. For example, there can be an organizational requirement to use only a certain version of a software product. The product compliance feature works with the software inventory feature. The software inventory feature tracks software that is installed on client computers. Inventory data can show required critical software patches that are not yet deployed to specific computers. The product compliance feature identifies which software complies with corporate guidelines, requirements, or standards, and which does not. After noncompliant software is identified, you use software distribution to upgrade the software to bring it into compliance. Instead of relying on software databases to map discovered files to known applications, SMS scans the resource headers of program files or binary files to build a complete picture of the software that is installed on each managed client computer. Such an approach is inherently scalable and automatically identifies new applications when they are released. SMS is used to check installed software on all managed systems against a database of available critical updates. SMS can then automatically download and deploy the latest patches to those systems that require them.

This embodiment of the invention comprises at least an SMS 1601, a client 1602, and a network server 1603. The client 1602 includes an SMS agent 1604 for communicating with the SMS 1601, a QA plug-in 1606 for the SMS agent 1604, a quarantine policy (QP) plug-in 1607 for the SMS agent 1604, a Proof of Health (PoH) interface 1608, and an enforcer 1605 for communicating with the network server 1603. The network server 203 includes a PoH interface 1608, an SMS identity database (ID DB) 1622, and an enforcement server 1616, which denies client 1602 access to network resources until client 1602 presents a PoH signifying that client 1602 is in a valid security state. Until client 1602 presents a valid PoH, the client 1602 is in a quarantine state and has access only to designated network resources for fixing the client's security state. One such accessible resource is the SMS 1601, which issues the quarantine checks, quarantine policy, software, and patches necessary to present a valid PoH.

The SMS 1601 is available from the Microsoft Corporation, and is modified to issue a manifest of quarantine policies and checks, and to store the most recent checks and policies in an SMS quarantine database (DB) 1620. The SMS quarantine DB 1620 also stores the software and patches necessary to implement the quarantine policies and checks. The SMS 1601 is also modified to analyze the manifest results, and store an SMS ID DB 1621 a BoH, quarantine check ID, and public key for each client. The quarantine check ID is a globally unique ID that identifies the quarantine checks that were performed for the BoH. Because a manifest may require checks that are not mandatory, the quarantine check ID computed as the SHA1 hash of the mandatory quarantine checks. The SMS ID DB 1621 is replicated and updated on each authenticated network server, and is accessible only to authenticated network servers. Thus, the SMS ID DB 1621 and SMS ID DB 1622 are identical.

The QA plug-in 1606 and QP plug-in 1607 are plug-ins for the SMS agent 1604 that is available from the Microsoft Corporation. The QP plug-in 1607 is responsible for executing and implementing the quarantine checks and policies received from the SMS 1601. The QA plug-in is responsible for using the results of the quarantine policies and checks to generate a PoH. As shown in FIG. 20, the PoH comprises an SMS GUID 2010 for uniquely identifying the associated BoH record in an SMS ID DB, the quarantine check ID 2020, the time 2030 the PoH was generated, and a signature 2040 using the private key of the client.

Figure 17:
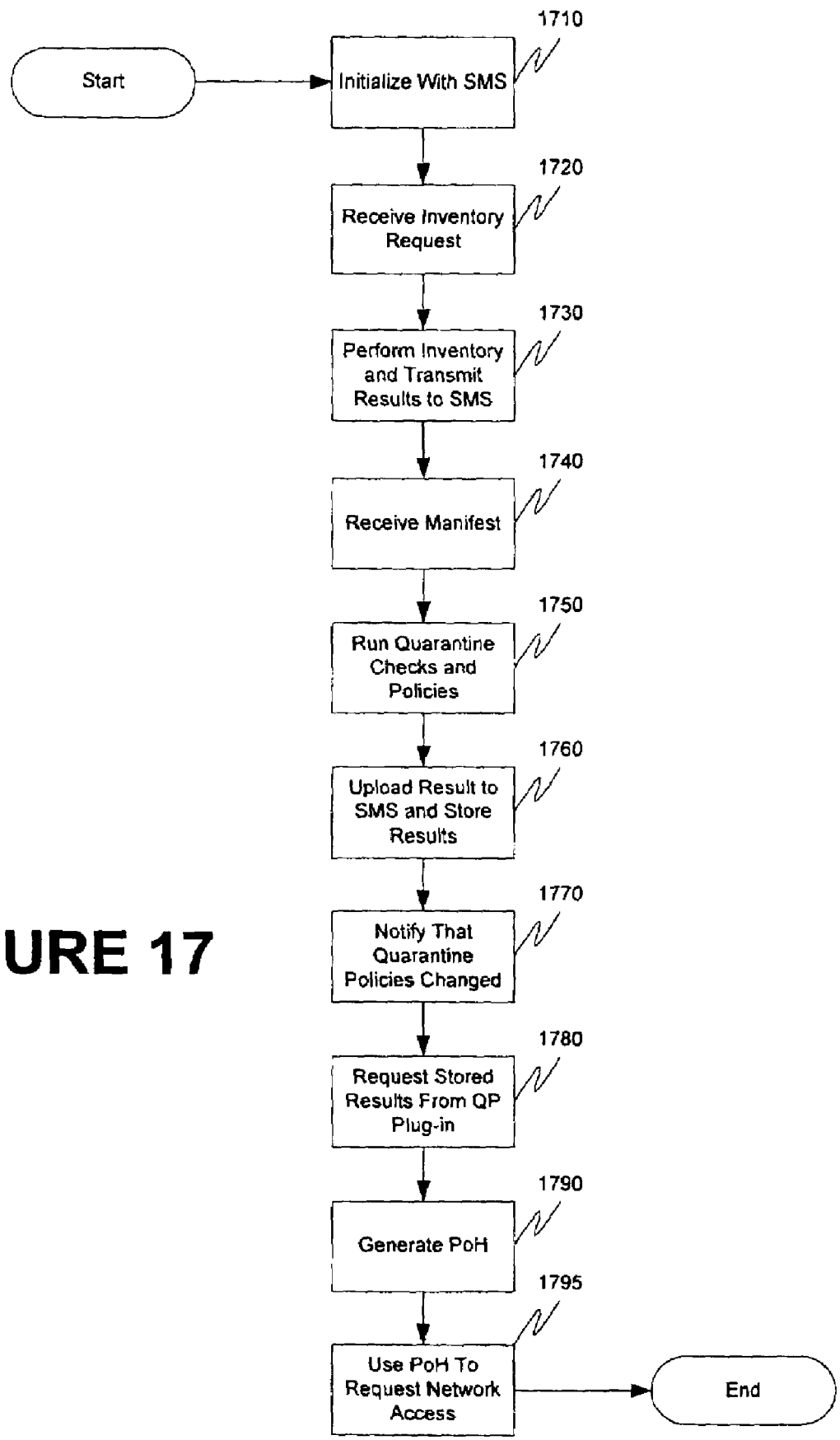
FIG. 17 is a flow diagram of the operation of the client of the invention where SMS is used.

The operation of the present embodiment is substantially similar to that of the previous embodiments. Accordingly, only the differences between the present embodiment and the previous embodiments are explained. With reference to FIG. 17, the client 1602 is initialized with the SMS 1601 at step 1710. The client may be directed to initialize with the SMS 1601 by a network server, as part of a start-up protocol, or for any other reason. At step 1720, SMS agent 1604 on client 1602 receives a request for a software inventory for the client. At step 1730, the SMS 1604 agent performs the inventory and returns the results to the SMS 1601. At step 1740, the SMS agent 1604 receives a manifest from the SMS 1601 containing quarantine policy and quarantine checks that the client 1602 must implement. The SMS agent also receives the software and patches that it needs to implement the quarantine policy and pass the quarantine checks.

The quarantine policy and checks are then passed to the QP plug-in 1607, which performs the checks and implements the policy at step 1750. At step 1760, the client 1602 uploads the results of the quarantine policy and checks to the SMS 1601, and also stores the results using Windows Management Instrumentation (WMI). The QA plug-in 1606 then sends a WMI event message at step 1770 notifying the other client components that the quarantine policy has changed. Assuming access to network resources is desired, the enforcer 1605 will request a PoH from QA plug-in 1606 at step 1780. At step 1790, the QA plug-in will query the QP plug-in for the quarantine policy and check results and use them to generate a PoH, which is returned to the enforcer 1605. The enforcer 1605 can then use the PoH to request access to network resources from a network server at step 1795. Thereafter, the client 1602 may request a new manifest if the PoH fails, or at any other time, and the SMS 1601 may request a new inventory when new software or patches are added, or at any other time.

Figure 18:
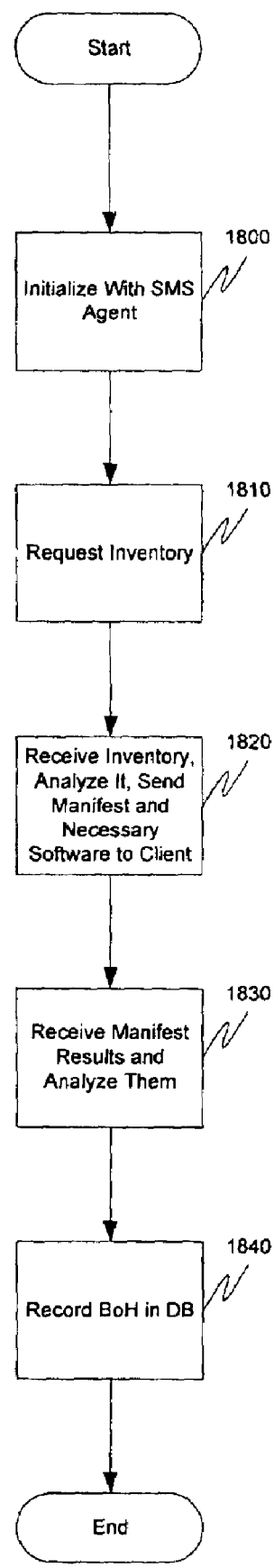
FIG. 18 is a flow diagram of the operation of the SMS in the invention.

FIG. 18 illustrates that SMS 1601 is initialized with the client 1602 at step 1800. The SMS 1601 sends an inventor request to the SMS agent 1604 requesting a software inventory for the client 1602 at step 1810. At step 1820, the SMS 1601 receives the inventory, analyzes it, and sends a manifest to client 1602. The manifest includes quarantine policies and quarantine checks, as well as software and patches that the client 1602 lacks, as observed from the inventory. At step 1830, the SMS 1601 receives the results of the execution of the quarantine policies and checks. Assuming the client 1602 correctly implemented the quarantine policies, the results will pass and a BoH is recorded in the SMS ID DB 1622 at step 1840, along with the public key of the client 1602 and the quarantine check GUID. The SMS ID DB for all network servers is also updated.

Figure 19:
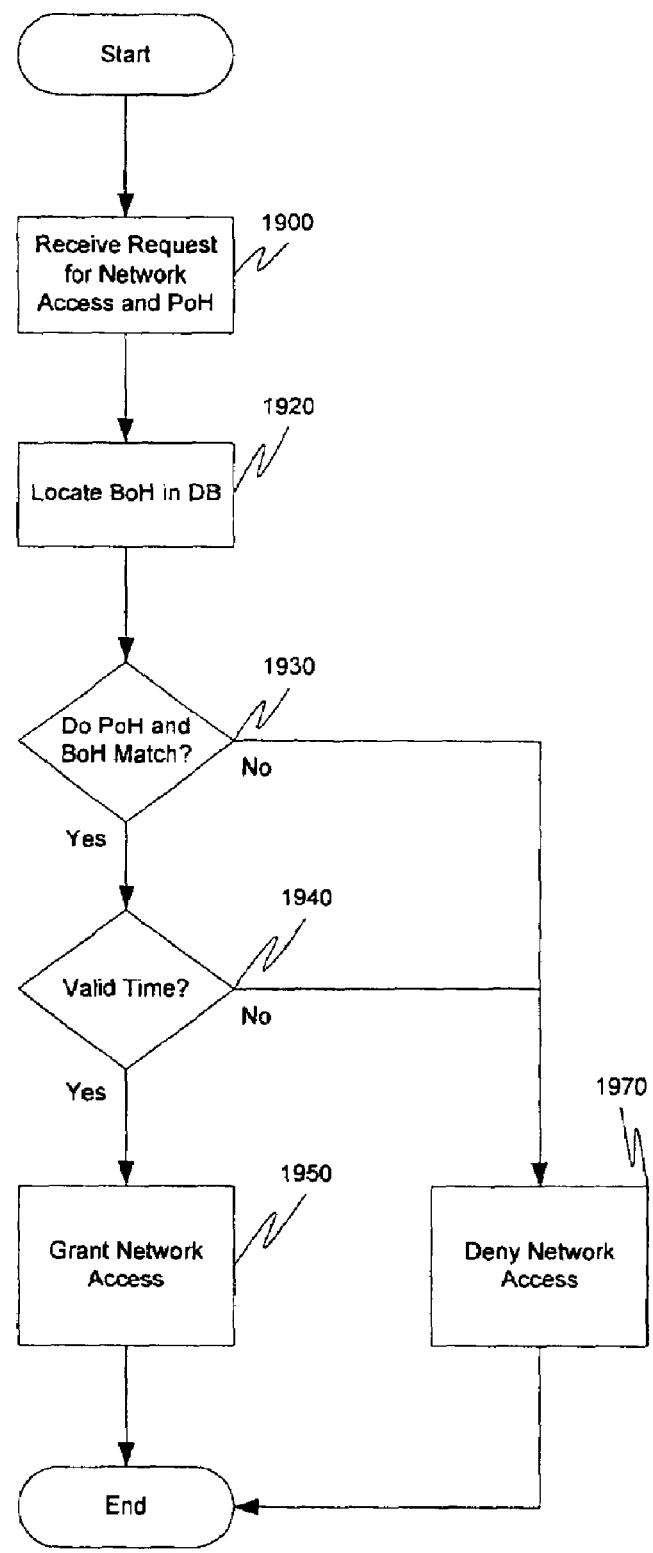
FIG. 19 is a flow diagram of the operation of the network server where SMS is used.
Figure 21:
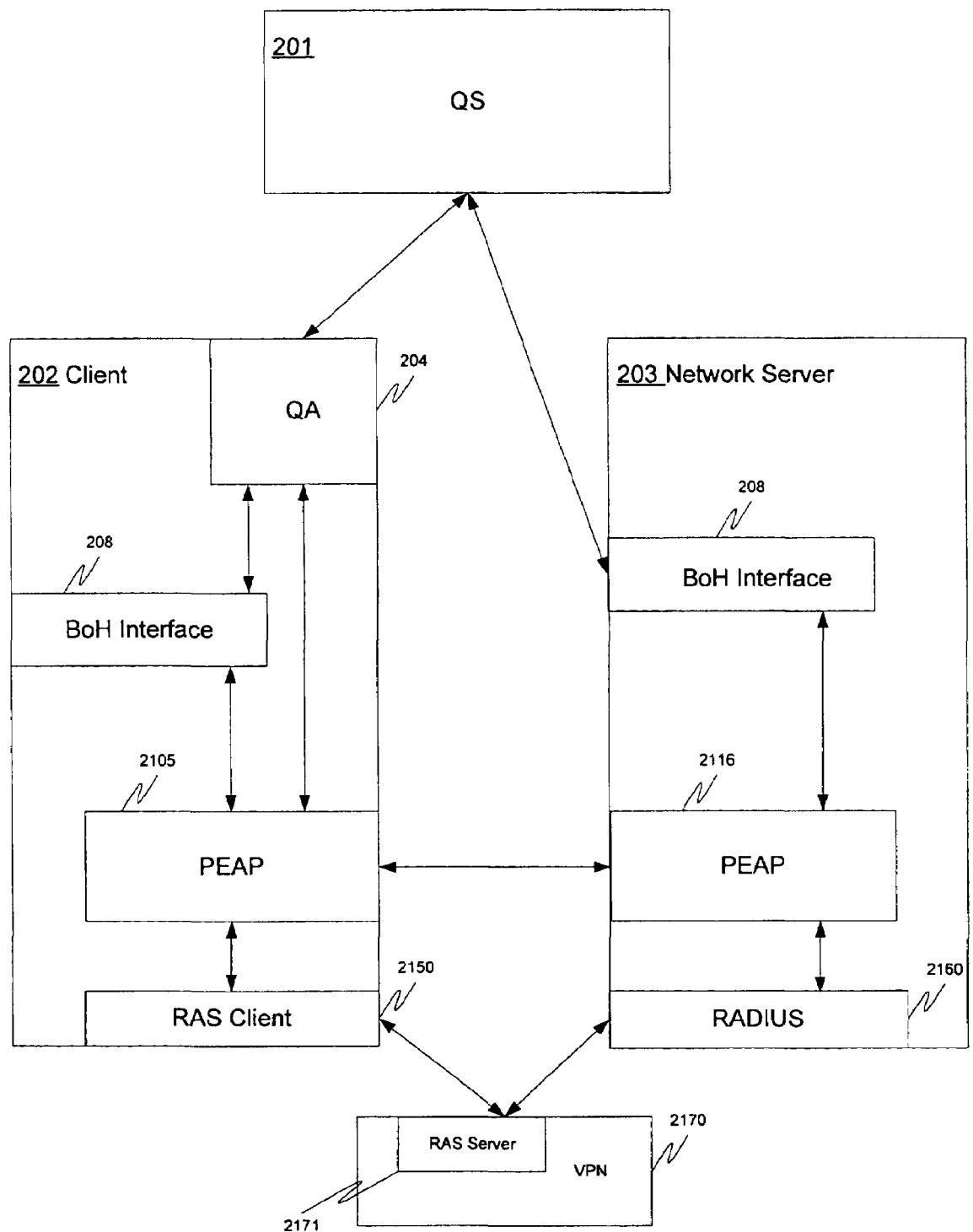
FIG. 21 is a schematic overview of an alternative embodiment of the invention where VPN is used.

FIG. 19 illustrates the operation of the network server 1603 in processing a request for network access. At step 1900 the enforcement server 1616 receives a request for network resources including a PoH. The enforcement server 1616 passes the PoH to the PoH interface 1608, which at step 1920 uses the SMS ID 2010 to locate the BoH, the public key of the client 1602, and the quarantine check GUID in the SMS ID DB 1622. At step 1930, the PoH interface 1608 decrypts the PoH using the public key of the client 1602 and compares the quarantine check ID 2020 of the PoH with the quarantine check ID of the BoH. If they do not match, network access is denied at step 1670. If they do match, the time 2030 of the PoH is compared with the current time at step 1940. If the time 2030 is within an acceptable range of the current time, network access is granted at step 1950. Otherwise, network access is denied at step 1670.

This embodiment of the invention is also implemented using the DHCP, PEAP VPN, PEAP 802.1X, or IPsec network protocol environments as previously described, as well as any network protocol environment supporting the requirements of PoH validation describe above.

Figure 22:
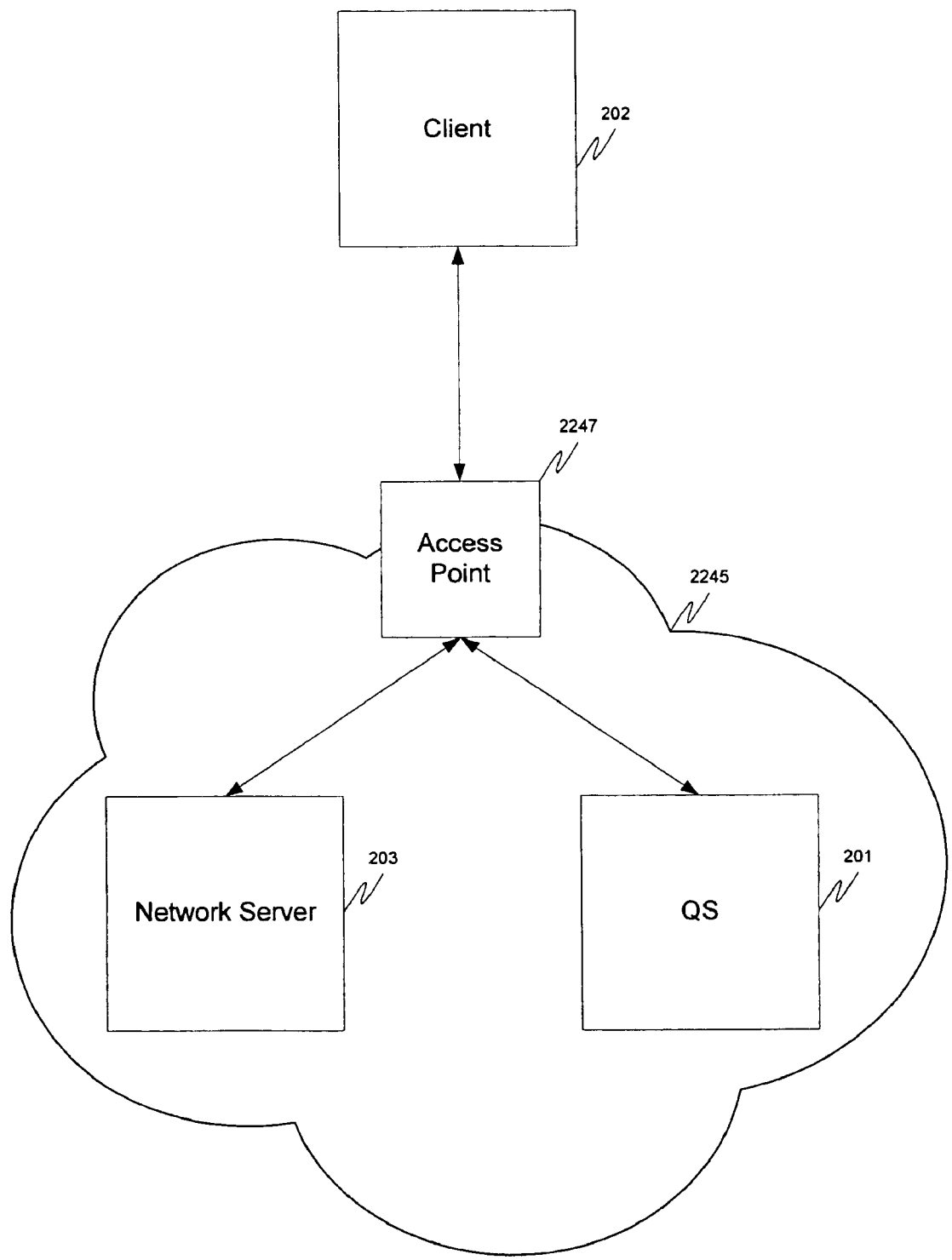
FIG. 22 is a schematic overview of an embodiment of the invention employing a firewall and an access point for the firewall.

In another embodiment of the invention, an access point acts as an intermediary between the client and the network server. FIG. 22 illustrates a modification of any of the previous embodiments of the invention, where network server 203 is protected by a firewall 2245, and client 202 communicates with network server 203 through access point 2247. Access point 2247 communicates with client 202 using a standard protocol, such as 802.11, and filters all packets received from client 202. When access point 2247 receives a request for access to network resources protected by the firewall, access point 2247 forwards the BoH or PoH to the network server 203 for validation. If the network server 203 validates the BoH or PoH, it notifies access point 2247 that the client 202 is authorized to access the requested network resource. Access point 2247 then grants client 202 access to the network resource. If network server 203 does not validate the BoH or PoH, it notifies the access point 2247 that client 202 is not authorized to access the requested network resource. Access point 2247 then denies access.

In an alternative to this embodiment, the QS 201 is also protected by the firewall 2245. When the request for access to network resources is rejected, client 202 redirected to QS 201. However, because QS 201 is also protected by the firewall 2245, the request for manifest is received by the access point 2247. Access point 2247 forwards the request to the QS 201, and QS 201 returns a current manifest to access point 2247. Access point 2247 then forwards the manifest to client 202. The results of the manifest checks are then sent by the client 202 to access point 2247, and access point 2247 forwards results to QS 201. Accordingly, client 202 can communicate with QS 201 and network server 203 using a standard protocol, even when QS 201 and network server 203 are protected by a firewall 2245.

A white list is needed for those systems that for some reason or other cannot go through the quarantine checks. While this is rarely needed for clients, it would be common with servers. The white list mechanism differs between the DHCP and IPsec embodiments. The VPN embodiment does not allow for a white list.

A DHCP white list is implicitly created by statically hosting a system. A system that has been statically hosted will never be quarantined using this system. This option should be used on servers. For clients that need to be white listed the QS supports manually creating BoH tokens with long lifetimes. These tokens can then be manually provisioned on the client by being entered in a REG_SZ registry key.

An IPsec white list can be created two ways. For systems that support IPsec the preferred solution is to generate a long-lived IPsec cert and deploy this cert, along with the quarantine IPsec policies, to that system. The management tool supports both generation of that cert and export of the quarantine IPsec policies to perform this task. For systems that do not support IPsec a white list is only needed if they need to initiate connections to the trusted members of the network. Trusted members will automatically fall back to clear so no white list is necessary if the white list systems only need to respond to connections.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A system for providing quarantine on a network comprising:
   a client device seeking access to a network resource, the client device configured to:
      perform a first plurality of checks specified by a first manifest,
      store a first status report at the client device, the first status report specifying results of the first plurality of checks, and
      send a Bill of Health (BoH) request that contains the first status report;
   a first server device that:
      receives the BoH request sent by the client device,
      determines whether the first status report indicates that the client device passed all of the checks specified by a second manifest that specifies a second plurality of checks that the client device must perform,
      sends to the client device the second manifest when the first status report indicates that the client device did not pass all of the checks specified by the second manifest,
      receives, from the client device, a second status report that indicates results of the client device performing the second plurality of checks,
      stores a Bill of Health (BoH) for the client device when the second status report indicates that the client device passed all of the checks in the second plurality of checks, the BoH comprising a creation time of the BoH, an expiration date of the BoH, a manifest version identifier that identifies a version number of the second manifest, and an integrity check;
      if the results of the second plurality of checks show that the client device passed all of the checks in the second plurality of checks, sends, to the client device, a certificate that provides proof that the client device possesses a required configuration, the certificate comprising a serial number of the BoH, an address of the first server device, and a digital signature; and
   a second server device that:
      receives a request for access to the network resource from the client device, the request including the certificate,
      uses the serial number in the certificate and the address of the first server device to retrieve the BoH from the first server device,
      uses the digital signature of the certificate to determine whether any part of the certificate has been modified after the certificate was issued by the first server device,
      after retrieving the BoH, uses the integrity check to determine whether the BoH has been tampered,
      determines whether the expiration date of the BoH has passed,
      determines whether the manifest version identifier identifies a most recent manifest version number,
      provides access to the network resource when the second server device determines that the certificate has not been modified after the certificate was issued by the first server device, that the BoH has not been tampered, that the expiration date for the BoH has not passed, and that the manifest version identifier specifies the most recent manifest version number,
      wherein the second server device denies the client device access to the network resource when the second server device determines that the certificate has been modified after the certificate was issued by the first server device, that the BoH has been tampered, that the expiration date for the BoH has passed, or that the manifest version identifier does not identify the most recent manifest version number;
   wherein the client device periodically requests that the certificate be updated by the first server device, regardless of whether the client device sends further requests for access to the network resource to the second server device.

2. The system of claim 1, wherein the second plurality of checks includes at least one of checks for: installed software, a software version, an installed patch, an installed anti-virus system, an anti-virus state, a firewall state, an installed service, file sharing, a registry value, a registry key, and a file system state.

3. The system of claim 1, wherein the client device comprises delegates that perform the checks in the first plurality of checks and the second plurality of checks.

4. The system of claim 1, wherein the client device stores a copy of the certificate in a database.

5. The system of claim 1, wherein if the client device cannot provide proof that the client device possesses the required configuration, the second server device directs the client device to the first server device.

6. The system of claim 1, wherein the second server device includes a second database that is a replica of a first database, wherein the client device proves possession of the required configuration by sending the second server device the serial number of the BoH, wherein the second server device compares the serial number of the BoH to a unique identifier stored with the certificate in the second database.

7. The system of claim 1, wherein the first server device requests a software inventory from the client device and sends, to the client device, software necessary for the required configuration.

8. The system of claim 1, further comprising an access point for mediating communication between the client device and the second server device, wherein the second server device is protected by a firewall.

9. The system of claim 1, wherein the first server device and the second server device are one computing device.

10. A method for a client device to acquire access to a network resource, comprising:
    performing, at the client device, a first plurality of checks specified by a first manifest;
    storing a first status report at the client device, the first status report specifying results of the first plurality of checks;
    sending a Bill of Health (BoH) request that contains the first status report from the client device to a first server device;
    receiving, at the client device, a second manifest of checks from the first server device when the first server device determines that the first status report indicates that the client device did not pass all of the checks specified by the second manifest, wherein the checks of the second manifest determine whether the client device possesses a required configuration;
    performing, at the client device, the checks in the second manifest of checks;
    sending, from the client device to the first server device, a second status report that indicates results of the checks of the second manifest;
    receiving, at the client device from the first server device, a certificate that provides proof that the client device possesses the required configuration,
        wherein the certificate comprises a serial number of a BoH for the client device stored at the first server device, an address of the first server device, and a digital signature, and
        wherein the BoH comprises a creation time of the BoH, an expiration date for the BoH, a manifest version identifier that identifies a version number of the second manifest, and an integrity check;
    sending, from the client device to a second server device that controls access to the network resource, a request for access to the network resource;
    sending from the client device to the second server device, the certificate;
    receiving, at the client device, access to the network resource when the certificate has not been modified after the certificate was issued by the first server device, the BoH has not been tampered, the expiration date for the BoH has not passed, and the manifest version identifier of the BoH identifies a most recent manifest version number;
    periodically requesting, from the client device, that the certificate be updated by the first server device, regardless of whether the client device sends further requests for access to the network resource to the second server device.

11. The method of claim 10, further comprising:
    receiving, at the client device, a request for a software inventory from the first server device;
    receiving, at the client device, software necessary for the required configuration; and
    installing the software at the client device.

12. The method of claim 10, wherein the first server device and the second server device are one computing device.

13. A method for quarantining a client device from access to a network resource, comprising:
    receiving, at a first server device, a request for access to the network resource from the client device;
    receiving, at the first server device from the client device, a certificate that provides proof that the client device has a required configuration, wherein the certificate specifies a serial number of a Bill of Health (BoH) generated by a trusted server device that only generates the BoH when the trusted server device receives, from the client device, a status report that indicates results of checks specified in a manifest sent to the client device by the trusted server device and the results of the checks show that the client device passed all the checks;
    sending, from the first server device to the trusted server device, a request for the BoH, the request for the BoH specifying the serial number of the BoH;
    receiving, at the first server device, the BoH, the BoH specifying a creation time of the BoH, an expiration date for the BoH, a manifest version identifier that specifies a version number of the manifest, and an integrity check;
    validating, at the first server device, the certificate when the certificate has not been modified after the certificate was issued by the trusted server device, the BoH has not been tampered, the expiration date of the BoH has not passed, and the manifest version identifier specifies a most recent manifest version number;
    if the certificate is valid, allowing the client device access to the network resource;
    if the certificate is invalid, denying the client device access to the network resource; and
    wherein the trusted server device periodically receives from the client device a request that the certificate be updated, regardless of further requests for access to the network resource.

14. The method of claim 13, further comprising, if the certificate is invalid, directing, at the first server device, the client device to the trusted server device so that the required configuration is obtained.

15. One or more computer readable storage media having computer-executable instructions that, when executed by a processing unit in a client device, cause the client device to perform a method for the client device to acquire access to a network resource, the method comprising the steps of:
    performing, at the client device, a first plurality of checks specified by a first manifest;

storing a first status report at the client device, the first status report specifying results of the first plurality of checks;

sending a Bill of Health (BoH) request that contains the first status report from the client device to a first server device;

receiving, at the client device, a second manifest of checks from the first server device when the first server device determines that the first status report indicates that the client device did not pass all of the checks specified by the second manifest, wherein the checks of the second manifest determine whether the client device possesses a required configuration of installed software;

performing, at the client device, the checks in the second manifest of checks;

sending a second status report that indicates results of the checks of the second manifest from the client device to the first server device;

receiving, at the client device from the first server device, a certificate that provides proof that the client device possesses the required configuration, wherein the certificate comprises a serial number of a BoH for the client device stored at the first server device, an address of the first server device, and a digital signature, and wherein the BoH comprises a creation time of the BoH, an expiration date for the BoH, a manifest version identifier that identifies a version number of the second manifest, and an integrity check;

sending, from the client device to a second server device that controls access to the network resource, a request to access to the network resource;

sending, from the client device to the second server device, the certificate;

receiving, at the client device, access to the network resource when the certificate has not been modified after the certificate was issued by the first server device, the BoH has not been tampered, the expiration date for the BoH has not passed, and the manifest version identifier of the BoH identifies a most recent manifest version number; and periodically sending, from the client device to the first server device, a request to update the certificate, regardless of further requests for access to the network resource.

16. A system for a client device to acquire access to a network resource, comprising:

a processing unit; and a memory coupled with and readable by the processing unit and having stored therein instructions which, when executed by the processing unit, cause a module to perform the following acts:

performing, at the client device, a first plurality of checks specified by a first manifest;

storing a first status report at the client device, the first status report specifying results of the first plurality of checks;

sending a Bill of Health (BoH) request that contains the first status report from the client device to a first server device;

receiving, at the client device, a second manifest of checks from the first server device when the first server device determines that the first status report indicates that the client device did not pass all of the checks specified by the second manifest, wherein the checks of the second manifest determine whether the client device possesses a required configuration;

performing, at the client device, the checks in the second manifest of checks;

sending, from the client device to the first server device, a second status report that indicates results of the checks of the second manifest;

receiving, at the client device from the first server device, a certificate that provides proof that the client device possesses the required configuration, wherein the certificate comprises a serial number of a BoH for the client device stored at the first server device, an address of the first server device, and a digital signature, and wherein the BoH comprises a creation time of the BoH, an expiration date for the BoH, a manifest version identifier that identifies a version number of the second manifest, and an integrity check;

storing the certificate at the client device;

sending, from the client device to a second server device that controls access to the network resource, a request to access the network resource;

determining, at the client device, whether the certificate stored at the client device is valid;

sending, from the client device to the first server device, a request to update the proof if the certificate is no longer valid;

sending, from the client device to the second server device, the certificate of the required configuration; and periodically sending, from the client device to the first server device, requests to update the certificate, regardless of further requests for access to the network resource.

\* \* \* \* \*